(12) United States Patent
Feng et al.

(10) Patent No.: US 10,134,177 B2
(45) Date of Patent: Nov. 20, 2018

(54) METHOD AND APPARATUS FOR ADJUSTING FACE POSE

(71) Applicant: Samsung Electronics Co., Ltd., Suwon-si (KR)

(72) Inventors: Xuetao Feng, Beijing (CN); Hao Feng, Beijing (CN); Hongwei Zhang, Beijing (CN); Lujin Gong, Beijing (CN); Changkyu Choi, Seongnam-si (KR); Jae-Joon Han, Seoul (KR); Sungjoo Suh, Seoul (KR); Wonjun Hwang, Seoul (KR); Biao Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 14/996,709

(22) Filed: Jan. 15, 2016

(65) Prior Publication Data

US 2016/0210500 A1      Jul. 21, 2016

(30) Foreign Application Priority Data

Jan. 15, 2015   (CN) .......................... 2015 1 0021503
Dec. 3, 2015    (KR) ........................ 10-2015-0171235

(51) Int. Cl.
   *G06T 15/10*         (2011.01)
   *G06T 19/20*         (2011.01)
   (Continued)

(52) U.S. Cl.
   CPC .......... *G06T 15/10* (2013.01); *G06K 9/00208* (2013.01); *G06K 9/00281* (2013.01);
   (Continued)

(58) Field of Classification Search
   None
   See application file for complete search history.

(56) References Cited

U.S. PATENT DOCUMENTS

| 5,602,891 | A | * | 2/1997 | Pearlman | ............... | A61B 6/463 |
| | | | | | | 250/363.01 |
| 6,967,658 | B2 | * | 11/2005 | Hunter | ................. | G06T 3/0093 |
| | | | | | | 345/473 |

(Continued)

FOREIGN PATENT DOCUMENTS

| CN | 102043943 A | * | 5/2011 |
| KR | 10-2005-0042369 A | | 5/2005 |

(Continued)

OTHER PUBLICATIONS

Translation of CN 102043943 A.*

(Continued)

*Primary Examiner* — Michelle M Entezari
(74) *Attorney, Agent, or Firm* — NSIP Law

(57) ABSTRACT

A method and an apparatus for adjusting a pose in a face image are provided. The method of adjusting a pose in a face image involves detecting two-dimensional (2D) landmarks from a 2D face image, positioning three-dimensional (3D) landmarks in a 3D face model by determining an initial pose of the 3D face model based on the 2D landmarks, updating the 3D landmarks by iteratively adjusting a pose and a shape of the 3D face model, and adjusting a pose in the 2D face image based on the updated 3D landmarks.

25 Claims, 22 Drawing Sheets

(51) Int. Cl.
  *G06K 9/62* (2006.01)
  *G06K 9/00* (2006.01)
(52) U.S. Cl.
  CPC .......... *G06K 9/621* (2013.01); *G06K 9/6209* (2013.01); *G06T 19/20* (2013.01)

(56) References Cited

U.S. PATENT DOCUMENTS

| | | | | |
|---|---|---|---|---|
| 7,616,807 | B2* | 11/2009 | Zhang | G06T 7/246 345/419 |
| 7,711,156 | B2* | 5/2010 | Kim | G06K 9/621 345/419 |
| 8,666,119 | B1* | 3/2014 | Mallet | G06T 19/00 345/419 |
| 9,317,785 | B1* | 4/2016 | Moon | G06K 9/00234 |
| 2006/0188131 | A1* | 8/2006 | Zhang | G06T 7/74 382/103 |
| 2007/0269086 | A1* | 11/2007 | Kerwin | G06K 9/00 382/128 |
| 2009/0010500 | A1* | 1/2009 | Kandaswamy | G06K 9/4671 382/118 |
| 2009/0096790 | A1* | 4/2009 | Wiedemann | G06K 9/00201 345/427 |
| 2009/0164405 | A1* | 6/2009 | Yang | G06K 9/32 706/46 |
| 2009/0309878 | A1* | 12/2009 | Otani | G06K 9/00208 345/427 |
| 2010/0013832 | A1 | 1/2010 | Xiao et al. | |
| 2010/0079450 | A1* | 4/2010 | Pizlo | G06K 9/32 345/419 |
| 2011/0254841 | A1* | 10/2011 | Lim | G06T 17/20 345/421 |
| 2011/0299741 | A1* | 12/2011 | Zhang | G06K 9/00228 382/117 |
| 2012/0289825 | A1* | 11/2012 | Rai | A61B 6/12 600/425 |
| 2013/0129159 | A1* | 5/2013 | Huijgens | G06K 9/00973 382/118 |
| 2013/0314437 | A1* | 11/2013 | Fujiwara | G06T 11/00 345/629 |
| 2014/0226900 | A1* | 8/2014 | Saban | G02B 5/08 382/165 |
| 2015/0125049 | A1* | 5/2015 | Taigman | G06K 9/00268 382/118 |
| 2017/0083751 | A1* | 3/2017 | Tuzel | G06T 3/0093 |

FOREIGN PATENT DOCUMENTS

| | | | | |
|---|---|---|---|---|
| KR | 10-1198322 B1 | 11/2012 | | |
| WO | WO 2015192369 A1 * | 12/2015 | ........... | G06T 17/205 |

OTHER PUBLICATIONS

Blanz, V., & Vetter, T. (Jul. 1999). A morphable model for the synthesis of 3D faces. In Proceedings of the 26th annual conference on Computer graphics and interactive techniques (pp. 187-194). ACM Press/Addison-Wesley Publishing Co..*

Miao Y, Tao X, Lu J. Robust Monocular 3D Car Shape Estimation From 2D Landmarks. IEEE Transactions on Circuits and Systems for Video Technology. Nov. 11, 2016.*

Wang, B., Feng, X., Gong, L., Feng, H., Hwang, W. and Han, J.J., Sep. 2015. Robust pose normalization for face recognition under varying views. In Image Processing (ICIP), 2015 IEEE International Conference on (pp. 1648-1652). IEEE.*

* cited by examiner

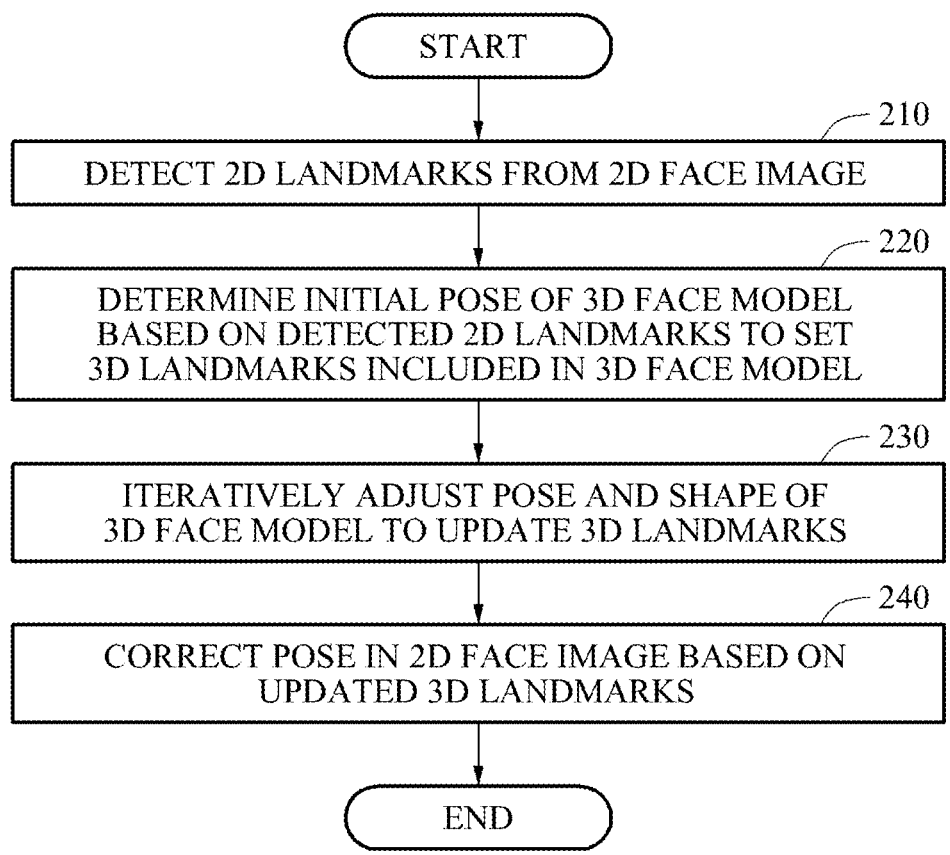

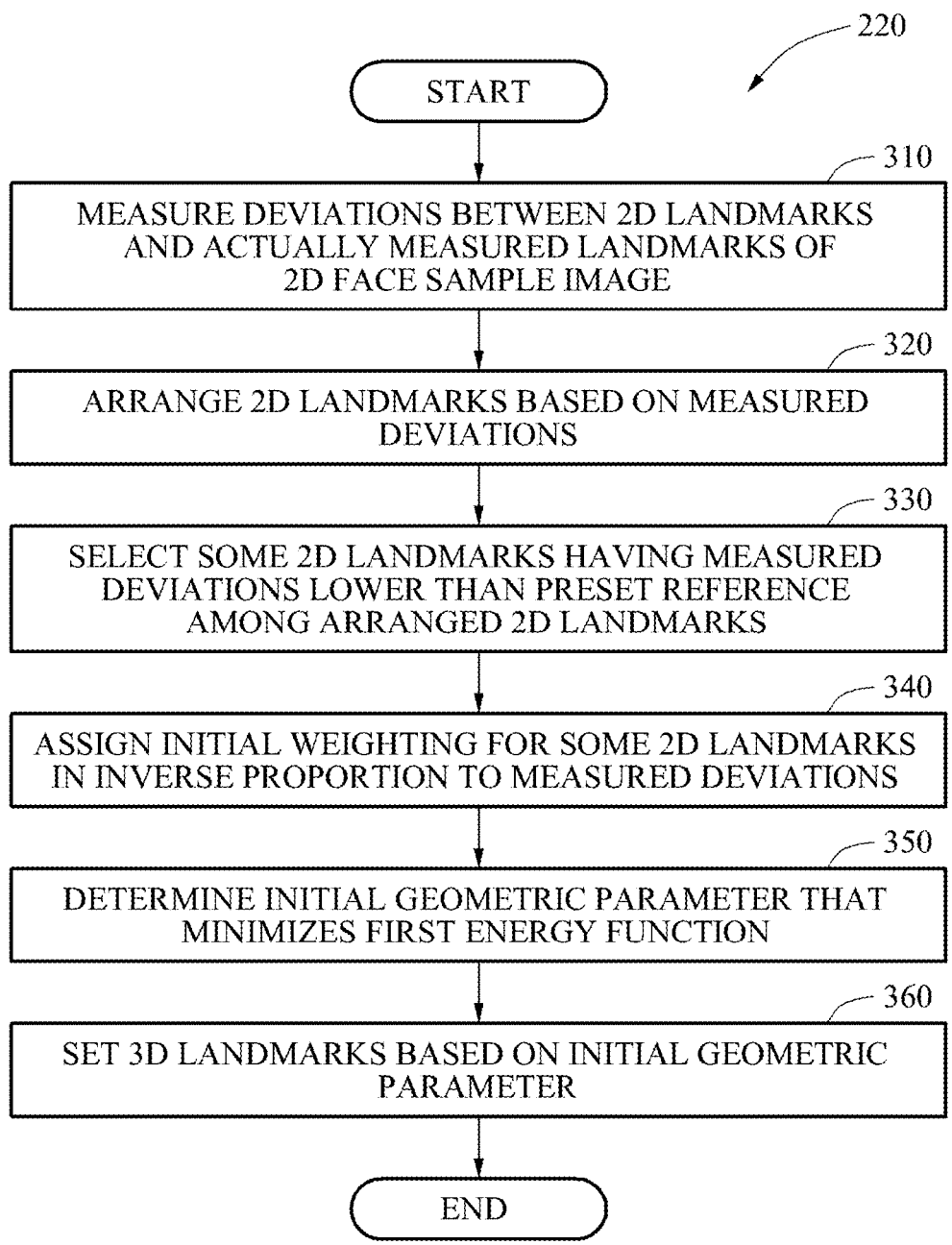

METHOD AND APPARATUS FOR ADJUSTING FACE POSE

CROSS-REFERENCE TO RELATED APPLICATION(S)

This application claims the benefit under 35 USC 119(a) of Chinese Patent Application No. 201510021503.1, filed on Jan. 15, 2015, in the State Intellectual Property Office of China, and Korean Patent Application No. 10-2015-0171235, filed on Dec. 3, 2015, in the Korean Intellectual Property Office, the entire disclosures of both of which are incorporated herein by reference for all purposes.

BACKGROUND

1. Field

The following description relates to a method and an apparatus for adjusting face pose in an image and a method and an apparatus for face recognition.

2. Description of Related Art

Facial recognition may be used as a method for user authentication and is suitable for a wide range of applications, such as human-computer interaction (HCI), games, artificial customer services, building security and the like. Face recognition is enabled by matching collected face images with face images stored in a database. However, face images collected under unconstrained circumstances have a variety of different poses, making the matching process difficult. For example, when a side view image of a face at a certain angle, which is not a frontal view image of the face, is collected by a camera, it may be difficult to use a computer to recognize the face based on a database that stores front view images of faces.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of adjusting a pose in a face image involves detecting two-dimensional (2D) landmarks from a 2D face image, positioning three-dimensional (3D) landmarks in a 3D face model by determining an initial pose of the 3D face model based on the 2D landmarks, updating the 3D landmarks by iteratively adjusting a pose and a shape of the 3D face model, and adjusting a pose in the 2D face image based on the updated 3D landmarks.

The positioning of the 3D landmarks may involve determining an initial geometric parameter representing the initial pose of the 3D face model based on the 2D landmarks.

The initial geometric parameter may include initial pose information on the 3D face model, and the initial pose information may be represented by a pose information vector comprising roll information, pitch information, and yaw information on the 3D face model.

The determining of the initial geometric parameter may involve determining an initial weight for the 2D landmarks based on the 2D landmarks, and determining the initial geometric parameter that minimizes a first energy function based on the initial weight, the 2D landmarks, and the 3D landmarks.

The determining of the initial weight may involve measuring deviations between the 2D landmarks and an actually detected landmark of a 2D face sample image stored in a face image database, and determining the initial weight for the 2D landmarks based on the measured deviations.

The determining of the initial weight for the 2D landmarks based on the measured deviations may involve arranging the 2D landmarks based on the measured deviation, selecting some 2D landmarks having measured deviations smaller than a preset threshold among the arranged 2D landmarks, and assigning the initial weight to the selected 2D landmarks in inverse proportion to measured deviations.

The face image database may include at least one of a plurality of 2D face sample images, actually detected landmarks from the 2D face sample images, and actually measured geometric parameters from the 2D face sample images.

The updating of the 3D landmarks may involve updating the 3D landmarks based on the initial geometric parameter, determining a weight for the updated 3D landmarks, and determining, based on the weight, a geometric parameter and a shape parameter of the 3D face model that minimize a second energy function.

The updating of the 3D landmarks based on the initial geometric parameter may involve adjusting the pose of the 3D face model based on the initial geometric parameter, acquiring a 2D texture image by two-dimensionally projecting the 3D face model with the adjusted pose, detecting new 2D landmarks from the 2D texture image, retrieving 3D landmarks corresponding to the new 2D landmarks, and updating the 3D landmarks using the retrieved 3D landmarks.

The determining of the weight for the updated 3D landmarks may involve acquiring current pose information on the 3D face model from the initial geometric parameter, retrieving pose information substantially corresponding to the current pose information on the 3D face model from a previously stored face image database, retrieving a 2D face sample image corresponding to the retrieved pose information from the face image database, and determining a weight for 2D landmarks corresponding to the retrieved 2D face sample image based on second deviations between the 2D landmarks and the new 2D landmarks.

The determining of the weight for the 2D landmarks may involve calculating an average of the second deviations, and determining the weight for the 2D landmarks in inverse proportion to the average of the second deviations.

The pose information substantially corresponding to the current pose information may include pose information with a deviation from the current pose information being within a preset threshold range.

The updating of the 3D landmarks may involve iteratively adjusting the pose and shape of the 3D face model based on whether a deviation between a geometric parameter of the 3D face model acquired in (i−2)th iteration and a geometric parameter acquired in (i−1)th iteration is smaller than a preset threshold or whether iteration is performed a preset number of times.

The adjusting of the pose in the 2D face image may involve reconstructing the 3D face model based on a final geometric parameter and a final shape parameter calculated in final iteration, and adjusting the pose in the 2D face image by two-dimensionally projecting the reconstructed 3D face model.

The general aspect of the method may further involve mapping a background preserving texture to the 2D face image with the adjusted pose.

The mapping of the background preserving texture may involve determining a 3D texture model by imparting a color to the reconstructed 3D face model based on a pixel color of the 2D face image; and determining a pixel color for a background region other than a face region in a face image obtained by two-dimensionally projecting the 3D texture model.

The determining of the 3D texture model may involve fitting vertexes of the reconstructed 3D face model to the 2D face image based on the final geometric parameter and the final shape parameter, assigning a texture of the fitted 2D face image to the vertexes of the reconstructed 3D face model, determining an occluded vertex in the 3D face model based on the final geometric parameter and the final shape parameter, and assigning a texture to the occluded vertex.

The assigning of the texture to the occluded vertex may involve determining whether a symmetric point of the occluded vertex is occluded in the 3D face model, and assigning an average texture value of the 3D texture model to the occluded vertex in response to the symmetric point being determined to be occluded, and assigning a texture of the symmetric point to the occluded vertex in response to the symmetric point being determined not to be occluded.

The determining of the pixel color for the background region may involve positioning additional landmarks for the background region in the two-dimensionally projected face image, retrieving a corresponding point to the additional landmarks from the 3D texture model, and acquiring a color value for the corresponding point to the additional landmarks by performing piece-wise affine transformation.

In another general aspect, a non-transitory computer readable medium may store therein instructions that cause a computer with hardware to perform the method of claim 1.

In yet another general aspect, an apparatus for adjusting a face pose in an image includes a processor configured to detect two-dimensional (2D) landmarks on a 2D face image, position three-dimensional (3D) landmarks in a 3D face model stored in a memory based on the detected 2D landmarks, iteratively adjust locations of the 3D landmarks on the 3D face model, and adjust a face pose in the 2D face image based on the locations of the 3D landmarks.

The general aspect of the apparatus may further include a camera configured to capture the 2D face image and a receiver configured to receive the 2D face image and provide the received 2D face image to the processor.

In yet another general aspect, an apparatus for recognizing a person based on a 2D image includes an apparatus for adjusting a face pose, and the processor is configured to compare the adjusted face pose in the 2D face image from thee apparatus for adjusting face pose with a plurality of face images stored in a database to recognize a person whose face is captured in the 2D face image.

Other features and aspects will be apparent from the following detailed description, the drawings, and the claims.

BRIEF DESCRIPTION OF THE DRAWINGS

FIG. 2 is a flowchart illustrating an example of a method of adjusting a face pose in an image.

FIG. 3 is a flowchart illustrating an example of a method of setting 3D landmarks.

Figure 1A:
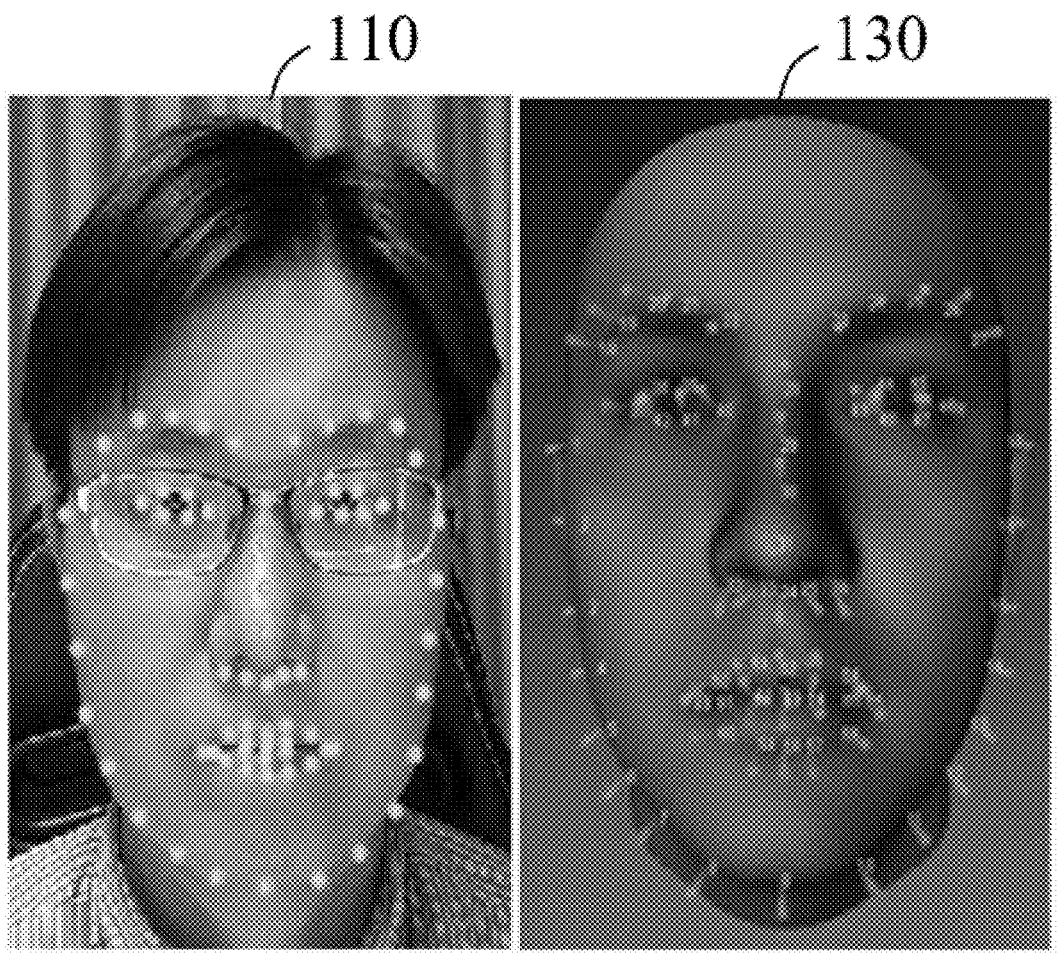
FIG. 1A illustrate an example of a two-dimensional (2D) face image including landmarks and an example of a three-dimensional (3D) face model including corresponding landmarks.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Particular structural or functional descriptions disclosed herein are provided only to illustrate examples, and the examples may be embodied in different forms and are not limited to those set forth herein.

Although terms of "first" or "second" are used to explain various components, the components are not limited to the terms. These terms are used only to distinguish one component from another component. For example, a first component may be referred to as a second component, or similarly, the second component may be referred to as the first component within the scope of the right according to the concept of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (for example, "between" versus "directly between," or "adjacent" versus "directly adjacent").

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not construed as an ideal or excessively formal meaning unless otherwise defined herein.

Figure 1B:
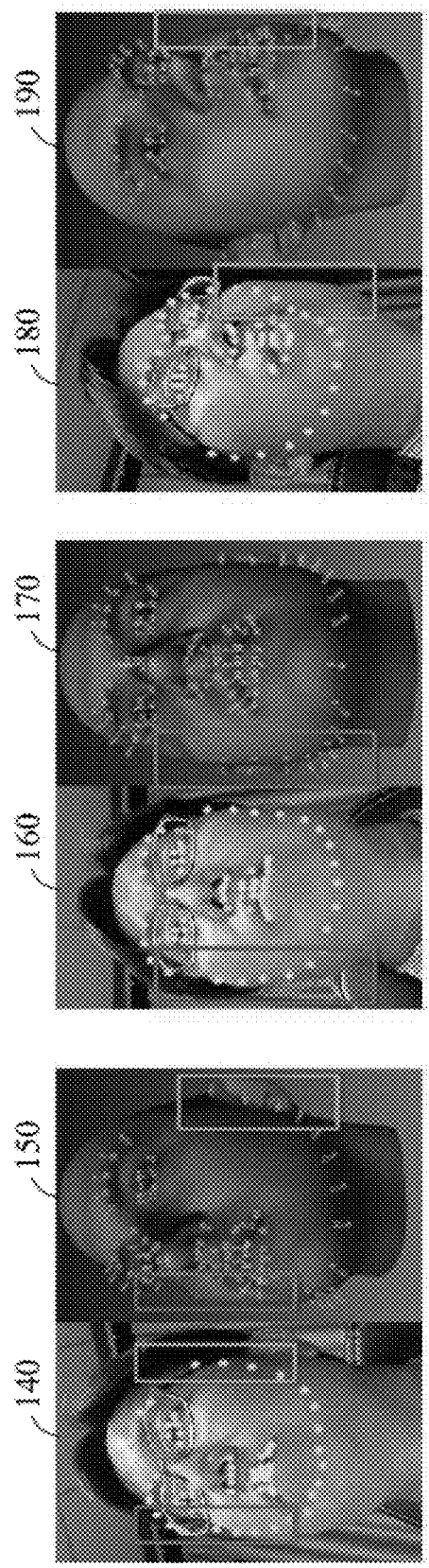
FIG. 1B illustrate additional examples of two-dimensional (2D) face images including landmarks and an example of a three-dimensional (3D) face model including corresponding landmarks.

Examples described below may be used to monitor drivers. The examples may be realized by various forms of products, such as tablet computers, smartphones, smart home appliances, intelligent vehicles, wearable devices, and the like. For instance, the examples may be employed to determine using the heart rate of a user measured with a smartphone, a wearable device, a mobile device, an intelligent vehicle, or the like whether the user has a health problem or is dozing and to take appropriate measures. The examples may be applied to intelligent vehicles in which the operation of a vehicle is switched between an autonomous mode and a manual mode. Hereinafter, the examples will be described in detail with reference to the accompanying drawings. Throughout the drawings, the same reference numerals refer to the same elements FIG. 1A illustrates an example of a two-dimensional (2D) face image in which landmarks are indicated, and a three-dimensional (3D) face model indicating landmarks corresponding to the landmarks indicated in the two-dimensional (2D) face. The 2D face image 110 illustrated in FIG. 1A depicts a frontal view face pose, and the 3D face model 130 corresponding to the 2D face image 110. In addition, FIG. 1B illustrates 2D face images 140, 160 and 180 with non-frontal view face poses, and 3D face models 150, 170 and 190 corresponding to the 2D face images 140, 160 and 180.

The 2D face image 110 may be collected using image pickup equipment, such as a camera found in a mobile terminal or a camera fixed to a building. Further, landmarks of the 2D face image 110 may be automatically detected by a landmark detector implemented by a computer processor that is trained in advance with a plurality of face images. Landmarks of the 3D face model 130 may be detected by matching the landmarks detected from the 2D face image 110 with the 3D face model 130 built based on the plurality of face images. A method of setting 3D landmarks of a 3D face model corresponding to 2D landmarks based on the 2D landmarks detected from the 2D face image 110 is well-known to a person skilled in the art, and thus a description thereof will be omitted herein.

For convenience of description, a landmark detected from a 2D face image is referred to as a "2D landmark," and a landmark detected from a 3D face image as a "3D landmark" hereinafter. In this example, a landmark refers to a location on a face that corresponds to certain physiological features common to faces in general. For example, a mouth is a physiological feature common to human faces, and a human mouth is characterized by upper and lower lips. The upper lip has a contour along cupid's bows and peaks of the corresponding bows, and connects to a philtrum leading to the nose. A landmark may be designated for a physiological feature. In another example, a plurality of landmarks may be designated throughout the face. For example, landmarks may be designated for the peaks of the bows of the upper lip and the like. In yet another example, landmarks may be designated along the contour of the lips, around the contour of chin, around the eye brow and the like.

In the event that the face in the 2D face image is in a frontal view face pose as illustrated in FIG. 1A, 2D landmarks in the 2D image 110 correspond to 3D landmarks in the 3D image 130 in a similar geometric orientation from one another. In the event that the face in the 2D face image is in a non-frontal view face pose as illustrated in FIG. 1B, however, 2D landmarks may not geometrically correspond to 3D landmarks in the 3D image 150, and proper adjustments are made to ensure the 2D landmarks correspond to 3D landmarks.

FIG. 2 is a flowchart illustrating an example of a method of adjusting a face pose in an image. Referring to FIG. 2, an example of an apparatus for adjusting a face pose in an image (hereinafter, "adjustment apparatus") detects 2D landmarks from a 2D face image in operation 210. As an example, the adjustment apparatus may be implemented as a mobile terminal, a smart device, a computer, a security system and the like.

In operation 210, the adjustment apparatus may determine a position of a face region in the 2D face image. For example, the adjustment apparatus may determine the position of the face region in the 2D face image using a face detector combined with an iterative algorithm of a multi-scale block local binary pattern (MB-LBP) technique and an adaptive boosting (AdaBoost) technique.

Subsequently, the adjustment apparatus may detect the 2D landmarks from the face region in the 2D face image using an Active Shape Model (ASM) method, an Active Appearance Model (AAM) method, and a Supervised Descent Method (SDM). For example, the adjustment apparatus may detect, as the 2D landmarks in the 2D face image, facial features automatically detected using the SDM from the face region in the 2D face image. Here, a number of the automatically detected facial features may be the same as a number of manually measured landmarks. In the illustrated example, the adjustment apparatus detects 68 2D landmarks from the 2D face image.

The adjustment apparatus may determine an initial pose of a 3D face model based on the detected 2D landmarks, thereby setting 3D landmarks included in the 3D face model in operation 220. The adjustment apparatus may determine an initial geometric parameter representing the initial pose of the 3D face model based on the 2D landmarks. The adjustment apparatus may set the 3D landmarks based on the initial geometric parameter.

The initial geometric parameter may include initial pose information on the 3D face model. The initial pose information may be represented by a pose information vector including roll information, pitch information, and yaw information on the 3D face model. Pose information on the 3D face model may be determined based on a geometric parameter.

The initial geometric parameter of the 3D face model may be determined by various methods. The initial geometric parameter of the 3D face model may be determined, for example, empirically or by a calculation according to a rule. A method of determining the initial geometric parameter of the 3D face model will be described below. A detailed method of the adjustment apparatus setting the 3D landmarks will be described with reference to FIG. 3.

The adjustment apparatus iteratively adjusts a pose and shape of the 3D face model to update the 3D landmarks in operation 230. The adjustment apparatus may update the 3D landmarks by an iteration process based on the initial geometric parameter of the 3D face model. The adjustment apparatus may update the 3D landmarks based on a geometric parameter of the 3D face model acquired in a previous iteration process and acquire a geometric parameter of the 3D face model in this iteration process based on the updated 3D landmarks.

The adjustment apparatus may adjust a pose of the 3D face model by iteratively updating a geometric parameter of the 3D face model. That is, the adjustment apparatus may confirm a face pose of the 3D face model based on a geometric parameter of the 3D face model.

For example, the adjustment apparatus may update a 3D landmark based on the initial geometric parameter of the 3D face model in a first iteration process and calculate a geometric parameter of the 3D face model obtained in first iteration based on the updated 3D landmark. That is, the adjustment apparatus may update a 3D landmark using a geometric parameter of the 3D face model obtained in previous iteration as the initial geometric parameter of the 3D face model and calculate a geometric parameter of the 3D face model in this iteration based on the updated 3D landmark.

The adjustment apparatus may also calculate a shape parameter of the 3D face model while calculating a geometric parameter of the 3D face model based on an updated 3D landmark.

As described above, a process of the adjustment apparatus updating the 3D landmarks may be performed by iteratively adjusting a pose and shape of the 3D face model, in which iteration may end according to whether an iteration end condition is satisfied.

For example, the adjustment apparatus may end iteration when a deviation between a geometric parameter of the 3D face model obtained in (i−2)th iteration and a geometric parameter obtained in (i−1)th iteration is smaller than a preset threshold or when an iteration process is performed a preset number of times (for example, n times). Here, i may be a natural number which is 2 or greater, and n may represent a total number of times the iteration process is performed.

Here, a deviation between geometric parameters may be replaced with a Euclidean distance between the geometric parameters. The threshold and the preset number of times may be determined empirically or by other calculation methods.

After finishing the iteration process each time, the adjustment apparatus may determine whether a result of the iteration process satisfies an iteration end condition. When a result of the iteration process satisfies the iteration end condition, the adjustment apparatus may stop the iteration process and determine a geometric parameter and a shape parameter of the 3D face model acquired in a last iteration process as a final geometric parameter and a final shape parameter. When the result of the iteration process does not satisfy the iteration end condition, the adjustment apparatus may perform a next iteration process. An operation of an example of an adjustment apparatus that updates the 3D landmarks will be described with reference to FIGS. 5 to 7.

The adjustment apparatus adjusts the face pose in the 2D face image based on the updated 3D landmarks in operation 240. The adjustment apparatus may confirm the geometric parameter of the 3D face model obtained in the final iteration process based on the updated 3D landmarks and confirm a 2D face image with the adjusted pose based on the confirmed geometric parameter. A detailed operation of the adjustment apparatus adjusting the pose in the 2D face image will be described with reference to FIG. 8.

In the example, the 3D landmarks may be updated based on a current geometric parameter of the 3D face model, so that the 3D landmarks confirmed based on the current geometric parameter of the 3D face model still correspond to the 2D landmarks. Further, the geometric parameter of the 3D face model finally confirmed based on the 3D landmarks may have higher accuracy.

In the example, the 2D face image with the pose adjusted using the geometric parameter of the 3D face model with high accuracy is confirmed to reduce a difference between the 2D face image with the adjusted pose and an actual front face image, thereby improving face recognition or identification performance.

FIG. 3 is a flowchart illustrating an example of a method of setting 3D landmarks. Referring to FIG. 3, the adjustment apparatus measures deviations between the 2D landmarks detected in operation 210 and actually measured landmarks of a 2D face sample image stored in a face image database in operation 310. In this example, a number of the actually measured landmarks of the 2D face sample image is equal to a number of the detected 2D landmarks.

Figure 4:
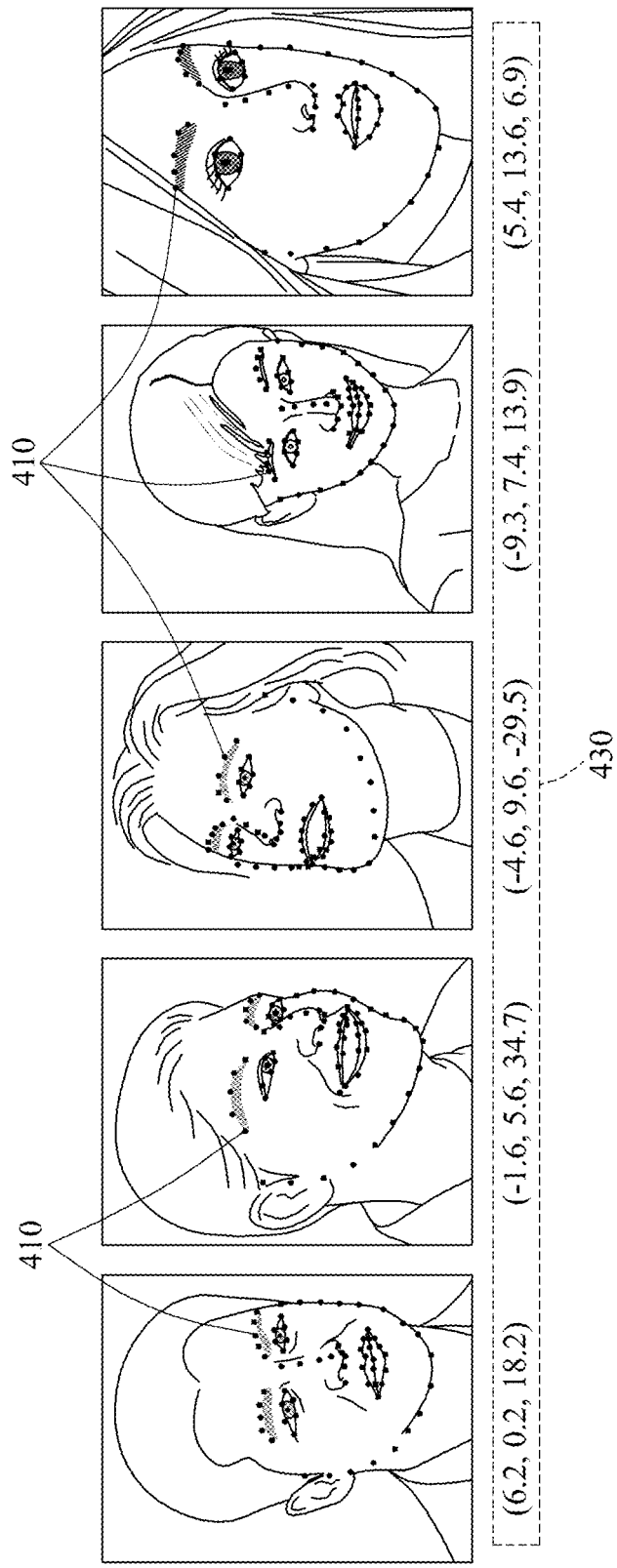
FIG. 4 illustrates 2D face sample images stored in an example of a face image database.

The face image database may include, for example, a plurality of 2D face sample images, actually measured landmarks of the 2D face sample images, and actually measured geometric parameters from the 2D face sample images. Examples of the 2D face sample images stored in the face image database are shown in FIG. 4.

The adjustment apparatus may determine initial weights of the 2D landmarks based on the measured deviations.

The adjustment apparatus may calculate Euclidean distances (deviations) between detected values (coordinates) of the 2D landmarks and actual coordinates of corresponding landmarks in the 2D face sample image. The adjustment apparatus may determine an initial weight of a 2D landmark based on the calculated Euclidean distances. In this example, a greater Euclidean distance (deviation) may represent lower reliability of 2D landmarks, and a smaller Euclidean distance (deviation) may represent higher reliability of 2D landmarks.

According to another example, the adjustment apparatus may extract, from the face image database, a 2D face sample image having landmarks substantially similar to 2D landmarks detected from an input 2D face image. Landmarks of the two images (2D face image and 2D face sample image) being similar to each other may refer to the fact that positions of corresponding landmarks of the two images are similar to each other. The adjustment apparatus may set deviations of the landmarks of the extracted 2D face sample image as deviations of the 2D landmarks detected from the input image. According to one example, the deviation of the landmarks of the extracted 2D face sample image may be calculated in advance and stored in the database. The adjustment apparatus may determine an initial weight based on the deviations of the detected landmarks.

The adjustment apparatus arranges the 2D landmarks based on the measured deviations in operation 320.

The adjustment apparatus selects some 2D landmarks having a measured deviation smaller than a preset reference among the arranged 2D landmarks in operation 330.

The adjustment apparatus assigns such initial weights for some 2D landmarks in operation 340. For example, the adjustment apparatus may calculate an initial weight for some 2D landmarks in inverse proportion to the measured deviations. The weight involve a weight matrix form stored in a memory. For example, the adjustment apparatus may assign a smaller initial weight for a landmark with a greater deviation and a greater initial weight for a landmark with a smaller deviation.

The adjustment apparatus determines an initial geometric parameter which minimizes a first energy function in operation 350. The adjustment apparatus may calculate an initial geometric parameter of a 3D face model based on the initial weight calculated in operation 340 and the 2D landmarks detected in operation 210. For example, the adjustment apparatus may calculate an initial geometric parameter which minimizes a first energy function ($E_1$) represented by Equation 1.

$$E_1 = W_1 \cdot \|u_1(g) - y_1\|^2 \qquad \text{[Equation 1]}$$

Here, $W_1$ is an initial weight (initial weight matrix) calculated in operation 340, and $u_1(g)$ is a matrix including projected coordinates of 2D landmarks obtained by two-dimensionally projecting 3D landmarks corresponding to initial geometric parameter g. $y_1$ is a matrix including detected values (coordinates) of a 2D landmark detected in operation 210.

An initial weight for 2D landmarks may be greater with detected values (coordinates) of the 2D landmarks being close to actual values, while the initial weight for the 2D landmarks may be smaller with the detected values of the 2D landmarks being different from the actual values.

The energy function according to the example may intensify effect of 2D landmarks with a comparatively small deviation detected by a landmark detector and reduce effects of 2D landmarks with a comparatively great deviation, thereby improving accuracy of the initial geometric parameter of the 3D face model.

The adjustment apparatus may determine the initial geometric parameter which minimizes the first energy function using gradient descent. Gradient descent is an algorithm to find a minimum of a function, which is well-known to a person skilled in the art, and thus an additional description thereof is omitted herein.

The adjustment apparatus may set 3D landmarks based on the initial geometric parameter in operation 360. One illustrative method of the adjustment apparatus setting 3D landmarks using an initial geometric parameter is described as follows.

When an initial geometric parameter is calculated, the adjustment apparatus may rotate a 3D mode based on the initial geometric parameter. The adjustment apparatus may two-dimensionally project the rotated 3D model to acquire a 2D texture image. The adjustment apparatus may detect a landmark or landmarks (2D landmark or 2D landmarks) from the acquired 2D texture image. In this example, since the 3D model is two-dimensionally projected above, the adjustment apparatus may recognize 3D data corresponding to 2D data. The adjustment apparatus may find positions of landmark(s) on the 3D model corresponding to the 2D landmark(s) from the 2D texture image to set 3D landmarks.

FIG. 4 illustrates 2D face sample images stored in an example of a face image database. Referring to FIG. 4, the face image database may include a plurality of 2D face sample images collected in advance. The 2D face sample images may be collected under unconstrained circumstances.

Landmarks 410 of face regions in the 2D face sample images may have been manually determined in advance. For example, 68 landmarks may be set for the face regions in the 2D face sample images. The manually set landmarks 410 may be locations on a face actually set by a person in a 2D face sample image based on some physiological features such as symmetry around the nose, contour of lips, eye lids, and eye brows. The actually measured 2D landmarks in the 2D face sample image may be used to determine an average deviation between 2D landmarks and a weight for a 2D landmark in a subsequent process for adjusting a face pose in an image.

Pose information 430 or face regions in each of the 2D face sample images included in the face image database may also be manually determined. The pose information 430 on the 2D face sample images may be represented by a pose information vector including an actually measured geometric parameter. The pose information vector may be represented, for example, in a form of roll, pitch, and yaw.

Pose information vectors of the 2D face sample images illustrated in FIG. 4 may be (6.2, 0.2, 18.2), (−1.6, 5.6, 34.7), (−4.6, 9.6, −29.5), (−9.3, 7.4, 13.9), and (5.4, 11.3, 6.9) from left to right.

Figure 5:
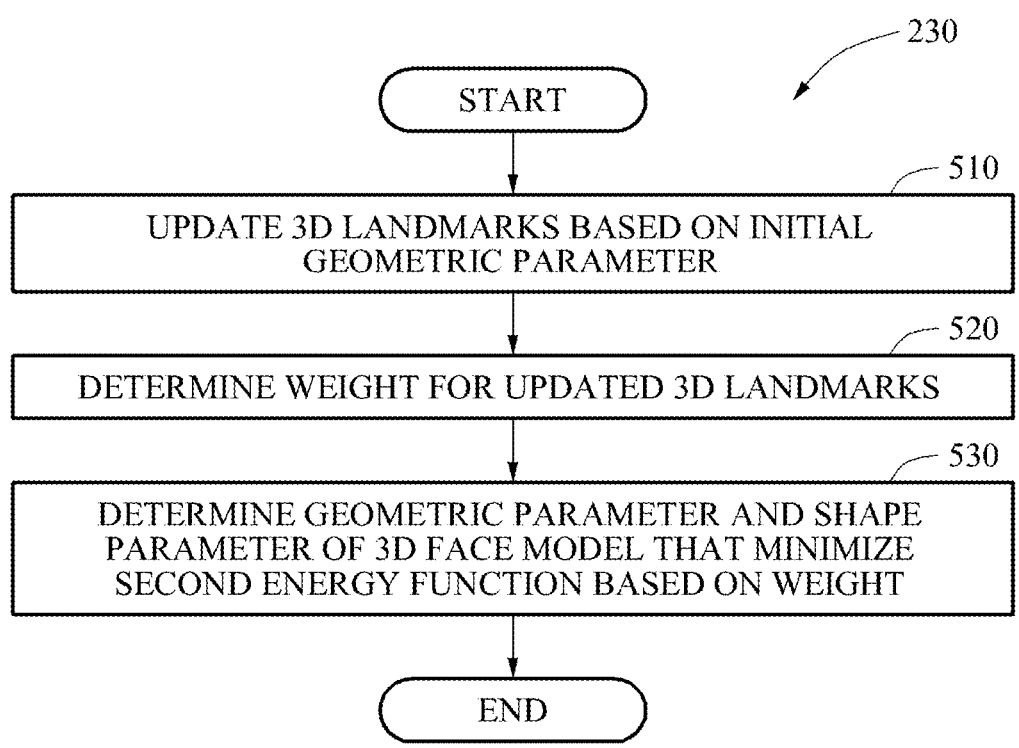
FIG. 5 is a flowchart illustrating an example of a method of updating 3D landmarks.

FIG. 5 is a flowchart illustrating an example of a method of updating 3D landmarks. Referring to FIG. 5, in operation 5010, an example of an adjustment apparatus may update 3D landmarks based on the initial geometric parameter determined in operation 350.

A method of the adjustment apparatus updating 3D landmarks based on the initial geometric parameter will be described with reference to FIG. 6.

The adjustment apparatus may determine a weight for the updated 3D landmarks in operation 520. A method of the adjustment apparatus determining the weight for the 3D landmarks will be described with reference to FIG. 7.

The adjustment apparatus may determine a geometric parameter and a shape parameter of the 3D face model which minimize a second energy function based on the weight in operation 530. The adjustment apparatus may determine a geometric parameter and a shape parameter of the 3D face model based on the 3D landmarks updated in operation 510 and new 2D landmarks detected from the 2D texture image in addition to the weight. The "new 2D landmarks" may be understood as landmarks detected from the 2D texture image obtained by two-dimensionally projecting the 3D face model with the pose adjusted based on the initial geometric parameter.

For example, the adjustment apparatus may determine the geometric parameter and the shape parameter of the 3D face model using a second energy function ($E_2$) represented by Equation 2.

$$E_2 = W_2 \cdot \|u_2(c,g) - y_2\|^2 + \eta \cdot \|c\|^2 \qquad \text{[Equation 2]}$$

Here, $W_2$ is a weight matrix (weight) of updated 3D landmarks determined in operation 520. $u_2(c,g)$ is a matrix including projected coordinates of 2D landmarks obtained by two-dimensionally projecting 3D landmarks corresponding to geometric parameter g and shape parameter c. $\eta$ is a regularization parameter to guarantee that a reconstructed 3D shape is positioned in a face space and looks natural.

A weight for 2D landmarks may be greater with detected values (coordinates) of the 2D landmarks being close to actual values, while the weight for the 2D landmarks may be smaller with the detected values of the 2D landmarks being different from the actual values.

The second energy function ($E_2$) according to the example may intensify effects of 2D landmarks with a comparatively small deviation and reduce effects of 2D landmarks with a comparatively great deviation through the iteration process, thereby improving accuracy of the geometric parameter of the 3D face model.

In the example, accuracy of the pose information on the 3D face model confirmed as the geometric parameter of the 3D face model in the final iteration process is improved to enhance accuracy of a 2D face image obtained by projecting the 3D face model, thereby increasing identification performance.

Figure 6:
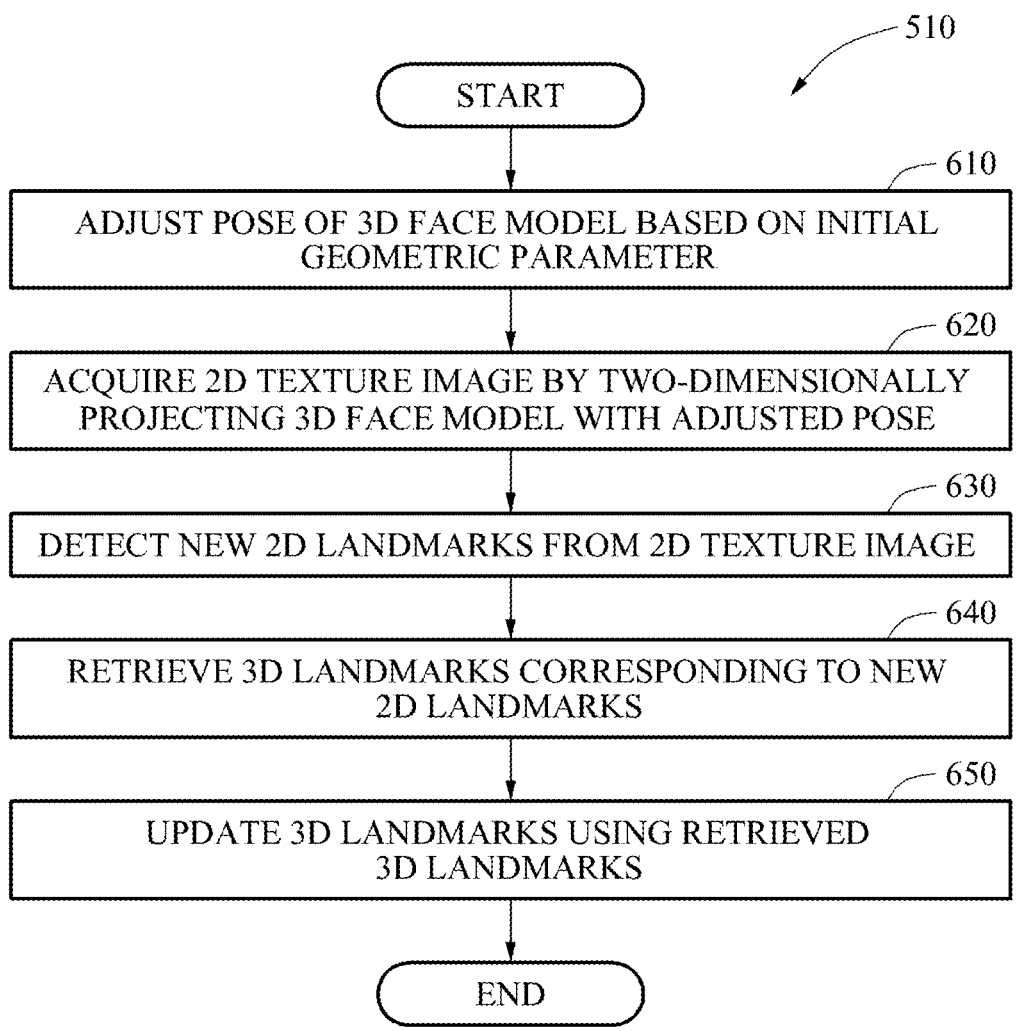
FIG. 6 is a flowchart illustrating an example of a method of updating 3D landmarks based on an initial geometric parameter.

FIG. 6 is a flowchart illustrating an example of a method of updating 3D landmarks based on an initial geometric parameter.

Referring to FIG. 6, in operation 610, an adjustment apparatus adjusts a face pose of the 3D face model based on the initial geometric parameter determined in operation 350.

The adjustment apparatus acquires a 2D texture image by two-dimensionally projecting the 3D face model with the adjusted pose in operation 620.

The adjustment apparatus detects new 2D landmarks from the 2D texture image in operation 630 and retrieve 3D landmarks corresponding to the new 2D landmarks in operation 640.

The adjustment apparatus updates the 3D landmarks using the retrieved 3D landmarks in operation 650.

Figure 7:
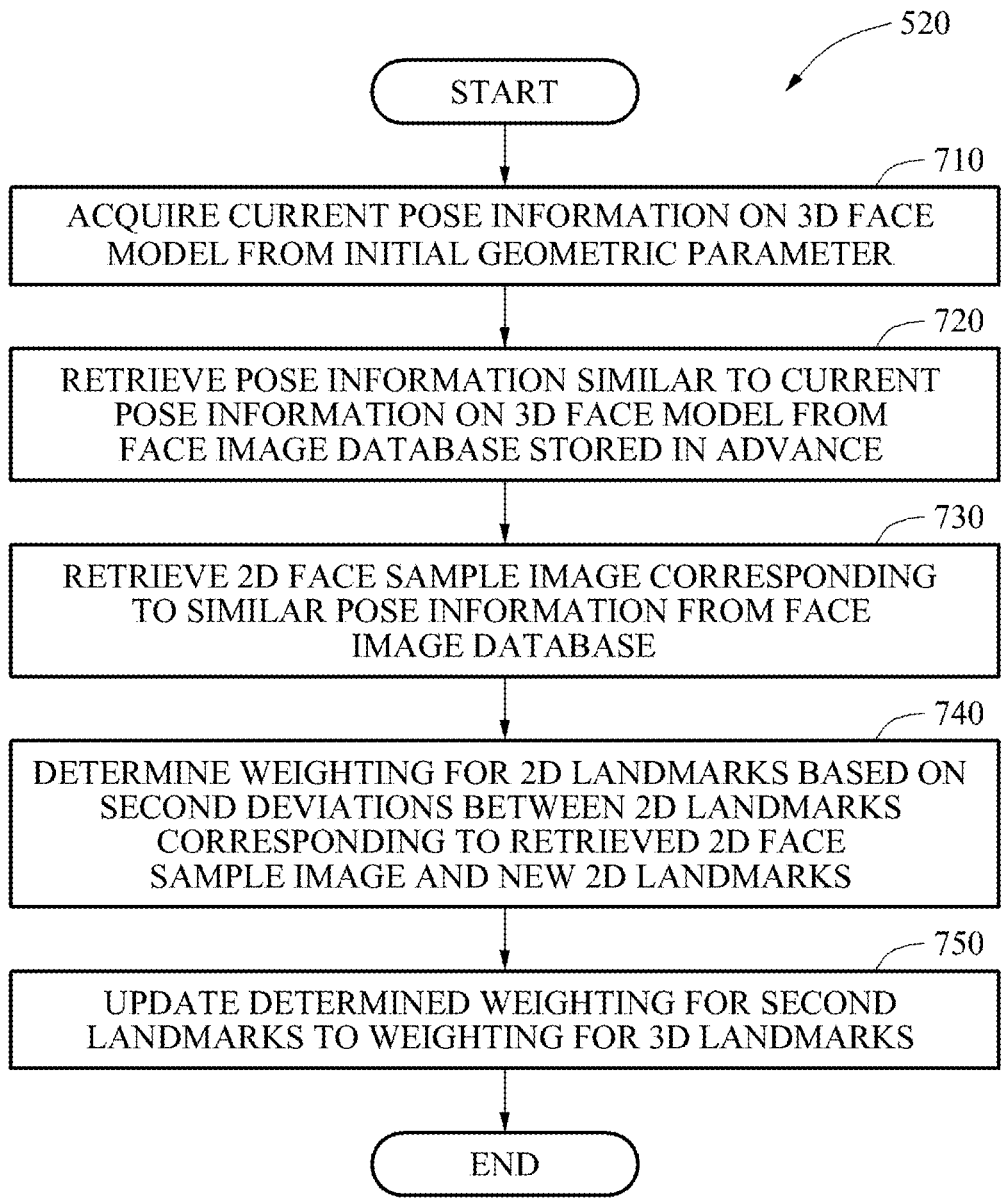
FIG. 7 is a flowchart illustrating an example of a method of determining a weight for updated 3D landmarks.

FIG. 7 is a flowchart illustrating an example of a method of determining a weight for updated 3D landmarks. Referring to FIG. 7, in operation 710, the adjustment apparatus according to the example may acquire current pose information on the 3D face model from the initial geometric parameter determined in operation 350.

The adjustment apparatus retrieves pose information similar to the current pose information on the 3D face model from the face image database stored in advance in operation 720.

The adjustment apparatus retrieves a 2D face sample image corresponding to the similar pose information from the face image database in operation 730. The adjustment apparatus may retrieve a 2D face sample image corresponding to pose information which is the same as or similar to the current pose information from the face image database collected in advance. Here, the "pose information similar to the current pose information" may include pose information with a deviation from the pose information the same as or similar to the current pose information being within a preset threshold range.

The adjustment apparatus determines a weight for the 2D landmarks based on second deviations between the 2D landmarks corresponding to the retrieved 2D face sample image and the new 2D landmarks in operation 740. The adjustment apparatus may calculate an average of the second deviations and determine a weight for the 2D landmarks in inverse proportion to the average of the second deviations in operation 740.

In operation 750, the adjustment apparatus updates the weight for the second landmarks determined in operation 740 to a weight for the 3D landmarks.

Figure 8:
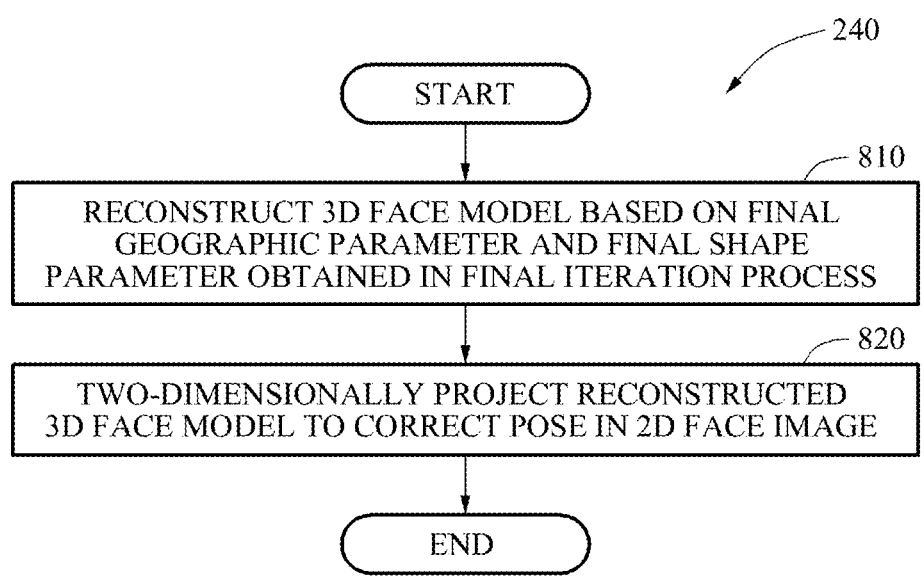
FIG. 8 is a flowchart illustrating an example of a method of adjusting a face pose in a 2D face image.

FIG. 8 is a flowchart illustrating an example of a method of adjusting a pose in a 2D face image. Referring to FIG. 8, the adjustment apparatus reconstructs (or transforms) the 3D face model based on the final geographic parameter and the final shape parameter obtained in the final iteration process in operation 810.

In this example, the adjustment apparatus two-dimensionally projects the reconstructed 3D face model to adjust a pose in the 2D face image, thereby obtaining the 2D face image with the adjusted pose in operation 820.

Figure 9:
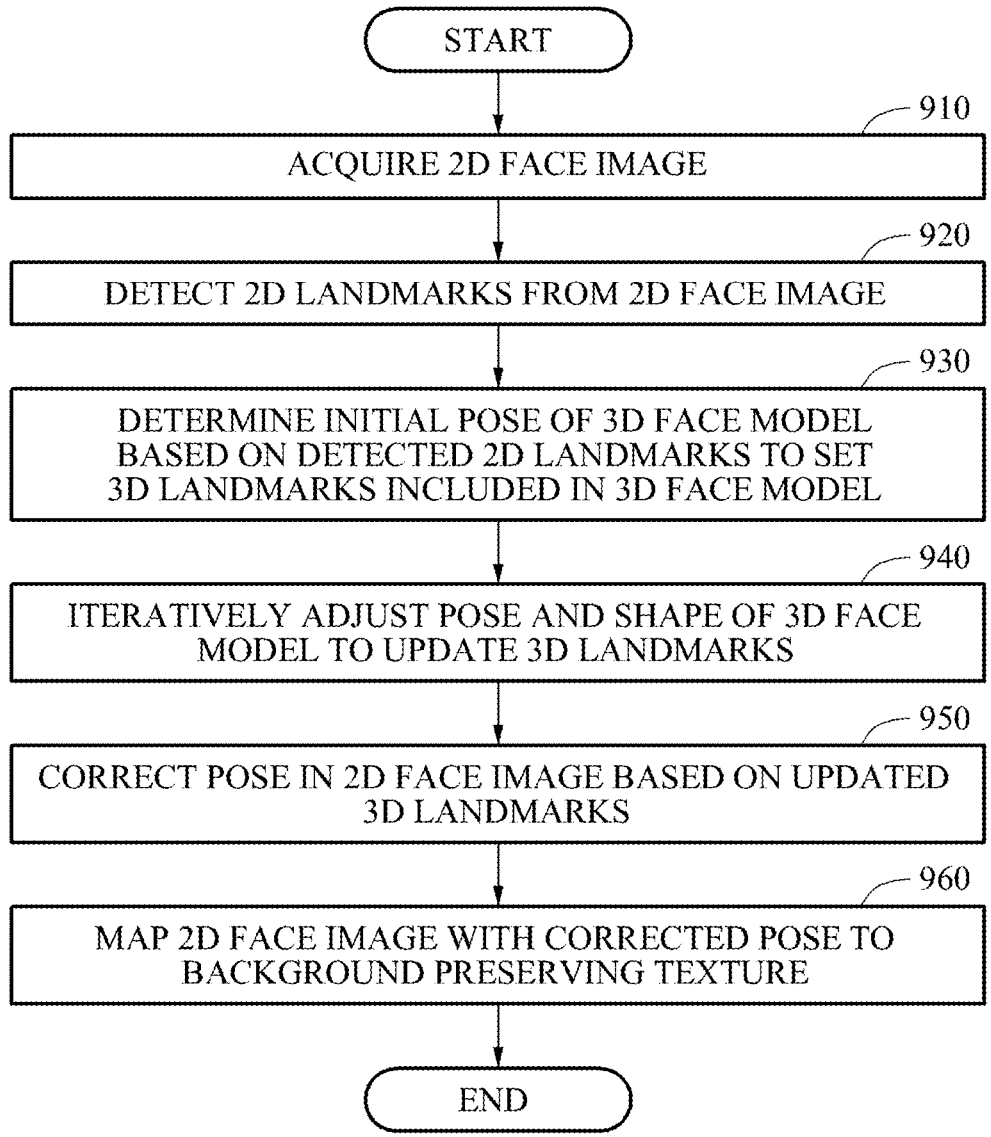
FIG. 9 is a flowchart illustrating another example of a method of adjusting a face pose in an image.

FIG. 9 is a flowchart illustrating another example of a method of adjusting a pose in a face image. Referring to FIG. 9, the adjustment apparatus acquires a 2D face image in operation 910 and detects 2D landmarks from the acquired 2D face image in operation 920. Operations 920 to 950 of FIG. 9 are the same as operations 210 to 240 of FIG. 2, and thus descriptions thereof are omitted.

The adjustment apparatus maps the 2D face image with a pose adjusted in operation 950 to a background preserving texture in operation 960. A method of the adjustment apparatus mapping the background preserving texture will be described with reference to FIG. 10.

Figure 10:
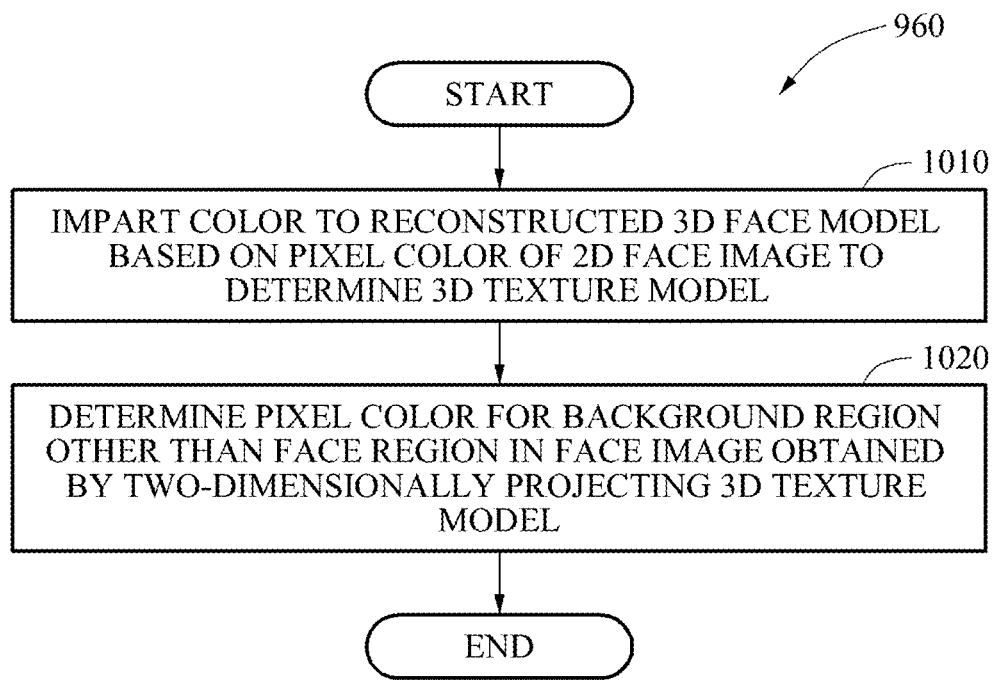
FIG. 10 is a flowchart illustrating an example of a method of mapping a background preserving texture.

FIG. 10 is a flowchart illustrating an example of a method of mapping a background preserving texture. Referring to FIG. 10, the adjustment apparatus imparts a color to (a vertex of) the reconstructed 3D face model based on a pixel color of the 2D face image to determine a 3D texture model in operation 1010. For example, the adjustment apparatus may determine whether a symmetric point of an occluded vertex of the 3D face model is also occluded based on the geometric parameter and shape parameter of the 3D face model acquired in final iteration and assign a texture (or color) of the symmetric point of the vertex or an average texture (average color) of the 3D texture model to the vertex. An operation of an example of an adjustment apparatus determining the 3D texture model will be described with reference to FIG. 11.

In this example, the adjustment apparatus determines a pixel color for a background region other than a face region in a face image obtained by two-dimensionally projecting the 3D texture model in operation 1020. For example, the adjustment apparatus may impart a color value to a background region having no color value, such as a portion filled with black dots, in the 2D face image corresponding to the 3D face model using a bilinear interpolation. A method of the adjustment apparatus determining the pixel color for the background region will be described with reference to FIG. 13.

Figure 11:
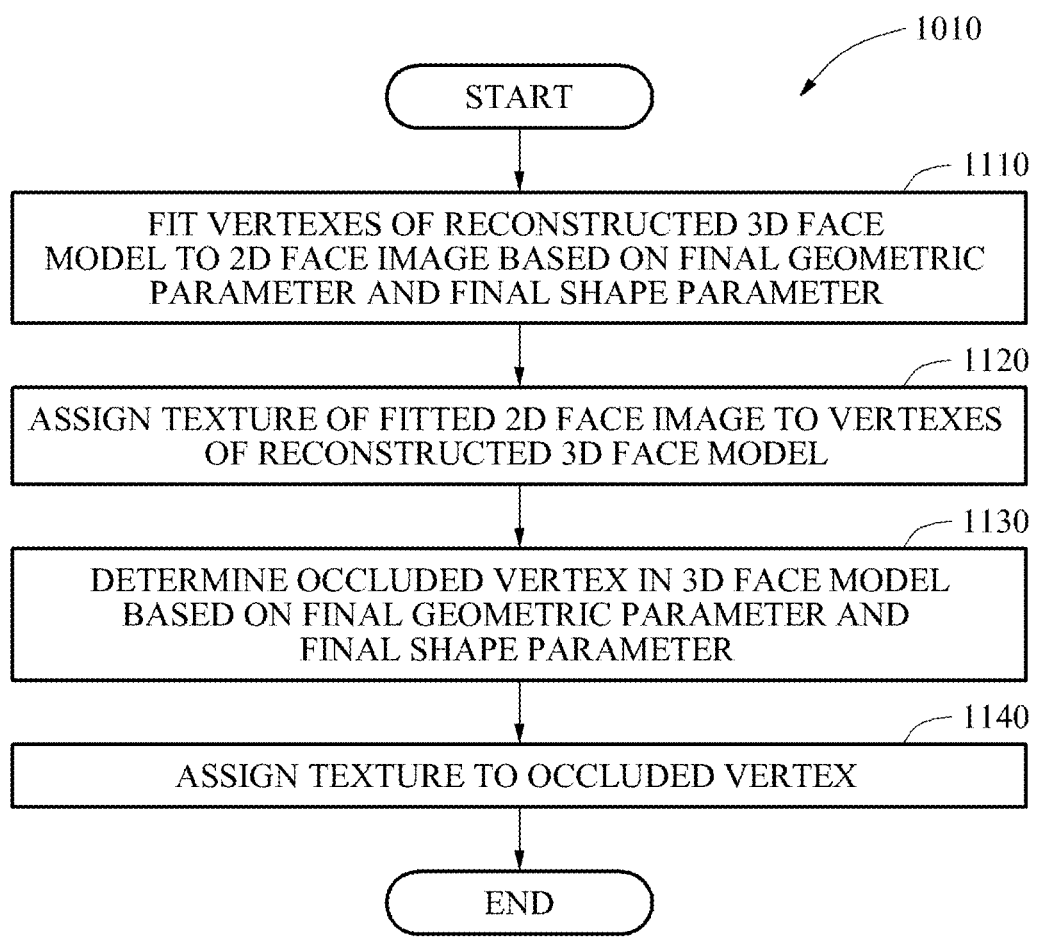
FIG. 11 is a flowchart illustrating an example of a method of determining a 3D texture model.

FIG. 11 is a flowchart illustrating an example of a method of determining a 3D texture model. Referring to FIG. 11, the adjustment apparatus fits vertexes of the reconstructed 3D face model to the 2D face image based on the final geometric parameter and the final shape parameter in operation 1110.

The adjustment apparatus assigns a texture of the fitted 2D face image to the vertexes of the reconstructed 3D face model in operation 1120.

The adjustment apparatus determines an occluded vertex in the 3D face model based on the final geometric parameter and the final shape parameter in operation 1130.

The adjustment apparatus assigns a texture to the occluded vertex in operation 1140. An operation of an example of an adjustment apparatus assigning the texture to the occluded vertex will be described with reference to FIG. 12.

Figure 12:
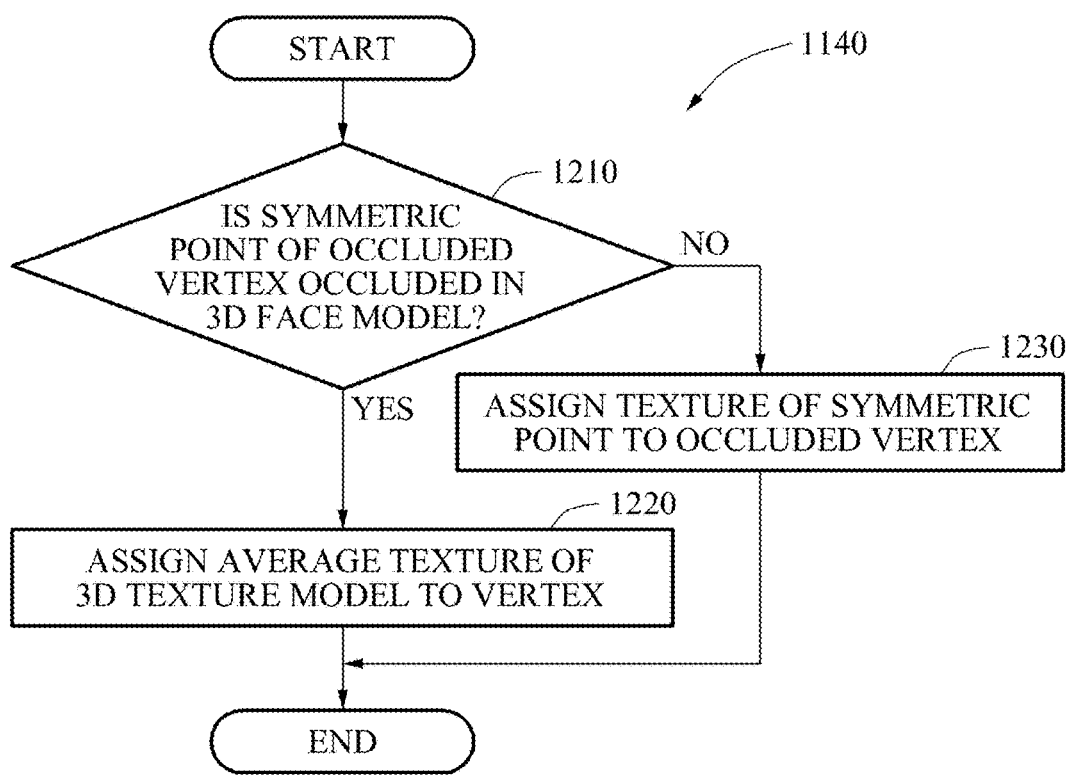
FIG. 12 is a flowchart illustrating an example of a method of assigning a texture to an occluded vertex.

FIG. 12 is a flowchart illustrating an example of a method of assigning a texture to an occluded vertex. Referring to FIG. 12, the adjustment apparatus determines whether a symmetric point of an occluded vertex in the 3D face model is occluded in operation 1210.

When the symmetric point is occluded in operation 1210, the adjustment apparatus may assign an average texture (average color) of the 3D texture model to the vertex in operation 1220.

When the symmetric point is not occluded in operation 1210, the adjustment apparatus may assign a texture (or color) of the symmetric point to the occluded vertex in operation 1230.

Figure 13:
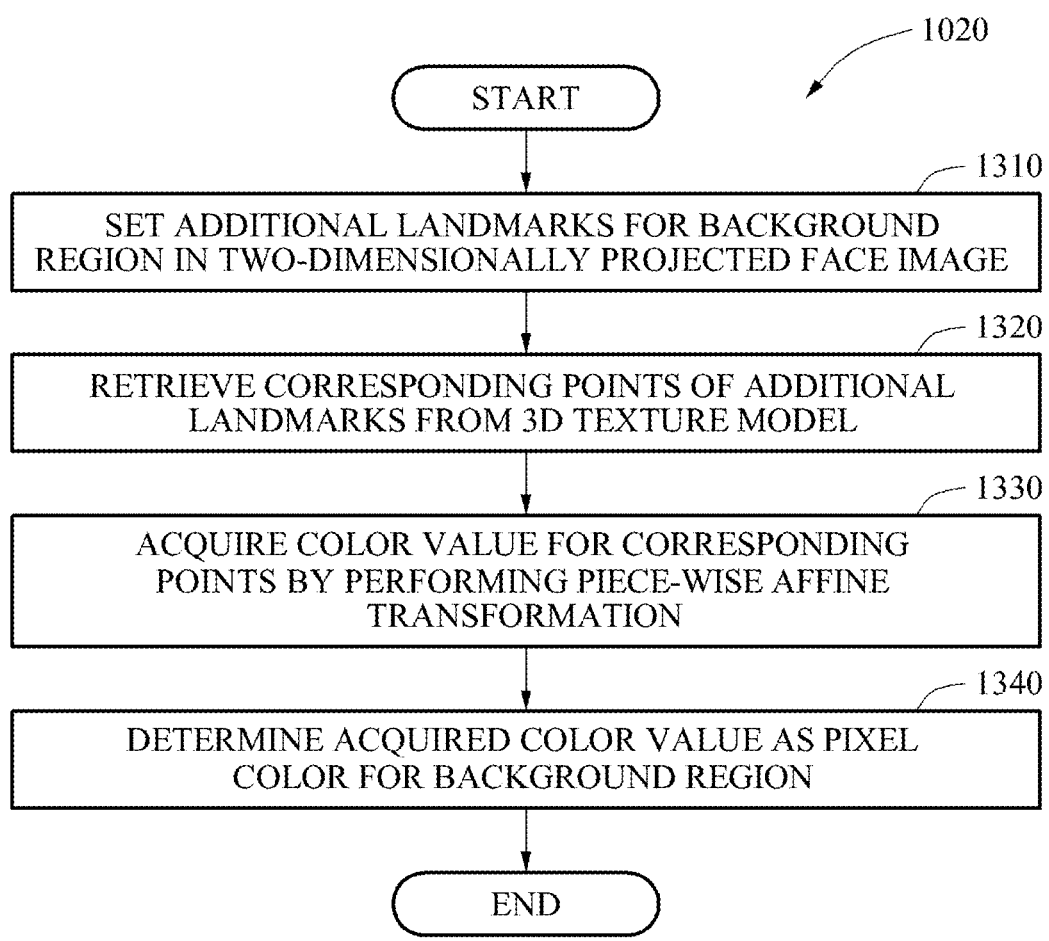
FIG. 13 is a flowchart illustrating an example of a method of determining a pixel image for a background region.

FIG. 13 illustrates a flowchart of an example of a method of determining a pixel image for a background region. Referring to FIG. 13, the adjustment apparatus sets additional landmarks for a background region in the two-dimensionally projected face image in operation 1310.

The adjustment apparatus retrieves corresponding points (or corresponding pixels) of the additional landmarks from the 3D texture model in operation 1320.

The adjustment apparatus acquires a color value for the corresponding points of the additional landmarks by performing piece-wise transformation in operation 1330. Affine transformation may be achieved geometrically by three points. When affine transformation is applied to one geometric body, the transformed geometric body maintains a parallel relationship with the original geometric body. Here, affine transformation may be movement, rotation, scaling and combinations thereof of the geometric body.

The adjustment apparatus may determine the acquired color value as a pixel color for the background region in operation 1340.

Figure 14:
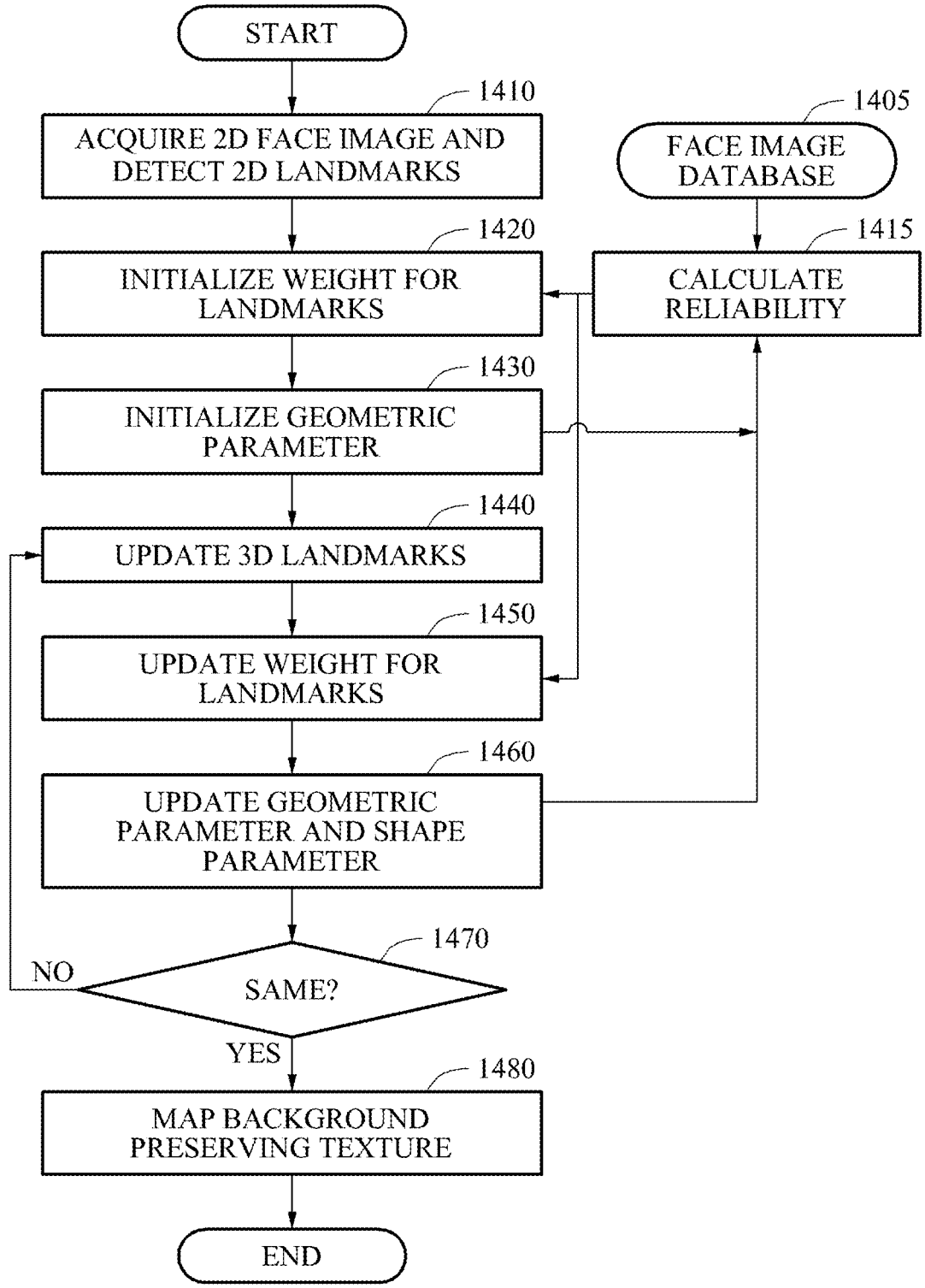
FIG. 14 is a flowchart illustrating another example of a method of adjusting a face pose in an image.

FIG. 14 illustrates a flowchart of another example of a method of adjusting a face pose found in an image.

Referring to FIG. 14, the adjustment apparatus acquires a 2D face image and detects 2D landmarks from the acquired 2D face image in operation 1410. The adjustment apparatus may detect the 2D landmarks using various kinds of landmark detectors.

The adjustment apparatus initializes a weight for the 2D landmarks in operation 1420. A method of the adjustment apparatus initializing the weight for the 2D landmarks will be described with reference to FIG. 16.

The adjustment apparatus may initialize a geometric parameter in operation 1430. The adjustment apparatus may initialize the geometric parameter using Equation 1. The adjustment apparatus may obtain a geometric parameter that minimizes the energy function in Equation by gradient descent. The geometric parameter may be stored in a memory.

The adjustment apparatus updates 3D landmarks based on the initialized geometric parameter in operation 1440. A method of the adjustment apparatus updating the 3D landmarks will be described with reference to FIG. 17.

The adjustment apparatus updates a weight for the updated 3D landmarks in operation 1450. A method of adjustment apparatus updating the weight for the 3D landmarks will be described with reference to FIG. 18.

The adjustment apparatus uses the calculated reliability between an actually detected landmark from a 2D face sample image stored in the face image database 1405 and a 2D landmark (or 3D landmark) in operations 1420 and 1450 determined in operation 1415 to initialized weights for landmarks. A method of the adjustment apparatus calculating the reliability will be described with reference to FIG. 15.

The adjustment apparatus updates the weight for the 2D landmarks (or 3D landmarks) based on the calculated reliability in operation 1450 and update a geometric parameter and a shape parameter based on the updated weight in operation 1460.

The adjustment apparatus determines whether a deviation (Euclidean distance) between the updated geometric parameter and the geometric parameter not updated is a preset reference value (for example, 5 degrees) in operation 1470.

In response to a determination that the deviation is not the preset reference value in operation 1470, the adjustment apparatus updates the 3D landmarks again in operation 1440.

In the example, the 3D landmarks of the 3D face model are iteratively updated, thereby maintaining a corresponding relationship between the confirmed 3D landmarks in the face image with the current pose and the 2D landmarks.

a. Further, in the example, the 3D landmarks of the 3D face model are gradually updated, thereby reducing an error between an actual frontal view face image and a adjusted face image which may occur in calculation using a 2D landmark and a 3D landmark which have no corresponding relationship.

b. In response to a determination that the deviation is the preset reference value in operation 1470, the adjustment apparatus maps a 2D face image with a finally adjusted pose onto a background preserving texture in operation 1480. In this example, the 2D face image with the finally adjusted pose is mapped onto the background preserving texture, thereby resolving a texture mapping error caused by landmarks inaccurately set for a surrounding region of a face region. An operation of an example of the adjustment apparatus mapping the background preserving texture will be described with reference to FIG. 19.

Figure 15:
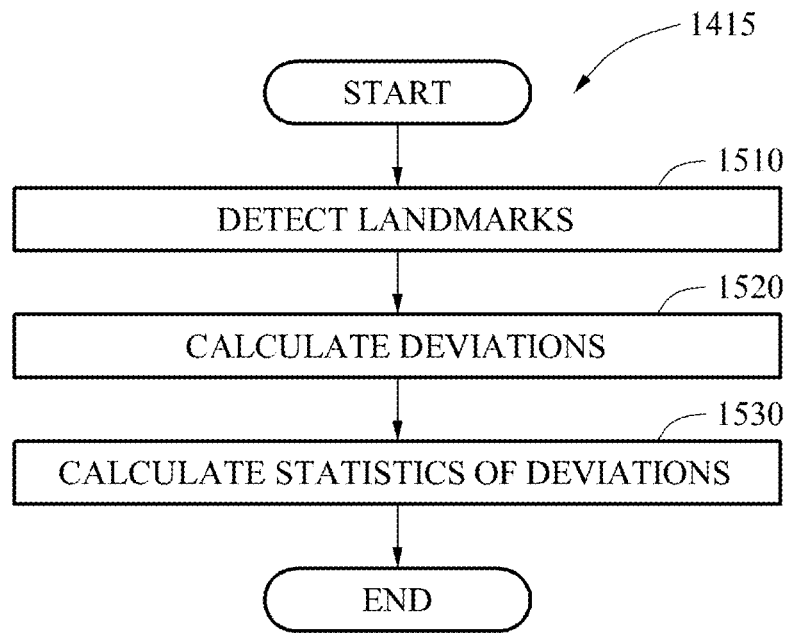
FIG. 15 is a flowchart illustrating an example of a method of calculating reliability.

FIG. 15 illustrates a flowchart of an example of a method of calculating reliability. Referring to FIG. 15, the adjustment apparatus actually detects landmarks of a 2D face sample image stored in the face image database in operation 1510.

The adjustment apparatus calculates deviations (or Euclidean distance) between the landmarks detected in operation 1510 and 2D landmarks detected from the 2D face image in operation 1520.

The adjustment apparatus calculates statistics (for example, average deviation) of the deviations in operation 1530. The adjustment apparatus may calculate an average deviation between landmarks detected in each of 2D face sample images that substantially correspond to a particular geographic parameter stored in the face image database and the 2D landmarks detected from the 2D face image.

The adjustment apparatus may calculate average deviations between detected values of landmarks detected offline from all 2D face sample images with a frontal view pose in the face image database and detected values of the 2D landmarks detected from the 2D face image. The adjustment apparatus may select some 2D landmarks having small average deviations and impart different weights to the selected 2D landmarks in inverse proportion to the average deviations. For example, the adjustment apparatus may select 25 2D landmarks having smaller average deviations among 68 2D landmarks of a face image and impart different weight to the selected 2D landmarks in inverse proportion to the average deviations.

Figure 16:
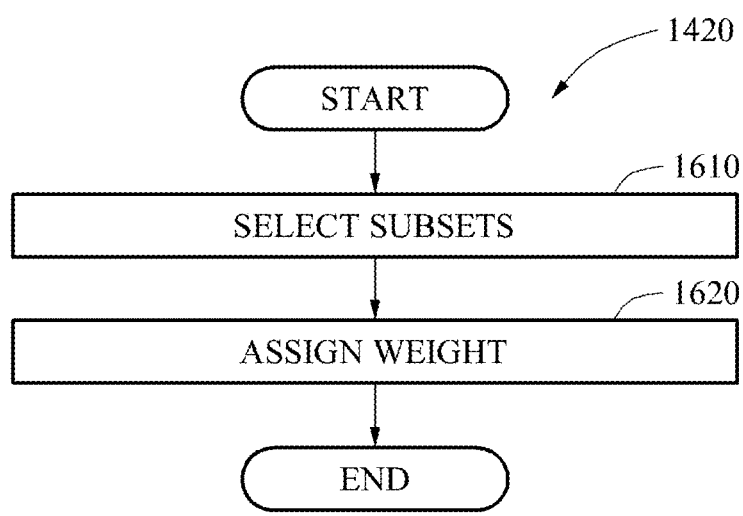
FIG. 16 is a flowchart illustrating an example of a method of initializing a weight for landmarks.

FIG. 16 illustrates a flowchart of an example of a method of initializing a weight for landmarks. Referring to FIG. 16, the adjustment apparatus selects subsets among N detected 2D landmarks in operation 1610. The adjustment apparatus may calculate deviations between the N detected 2D landmarks and actually detected landmarks from the 2D face sample image and arrange the 2D landmarks based on the calculated deviations. For example, the adjustment apparatus may arrange the N 2D landmarks in an ascending order of the measured deviations. The adjustment apparatus may select n higher 2D landmarks having measured deviations smaller than a preset threshold among the arranged N 2D landmarks.

The adjustment apparatus assigns a weight for the selected subsets (n higher 2D landmarks) in operation 1620. The adjustment apparatus may assign a weight (initial weight) for the n 2D landmarks having the measured deviations smaller than the preset threshold in inverse proportion to the measured deviations.

Figure 17:
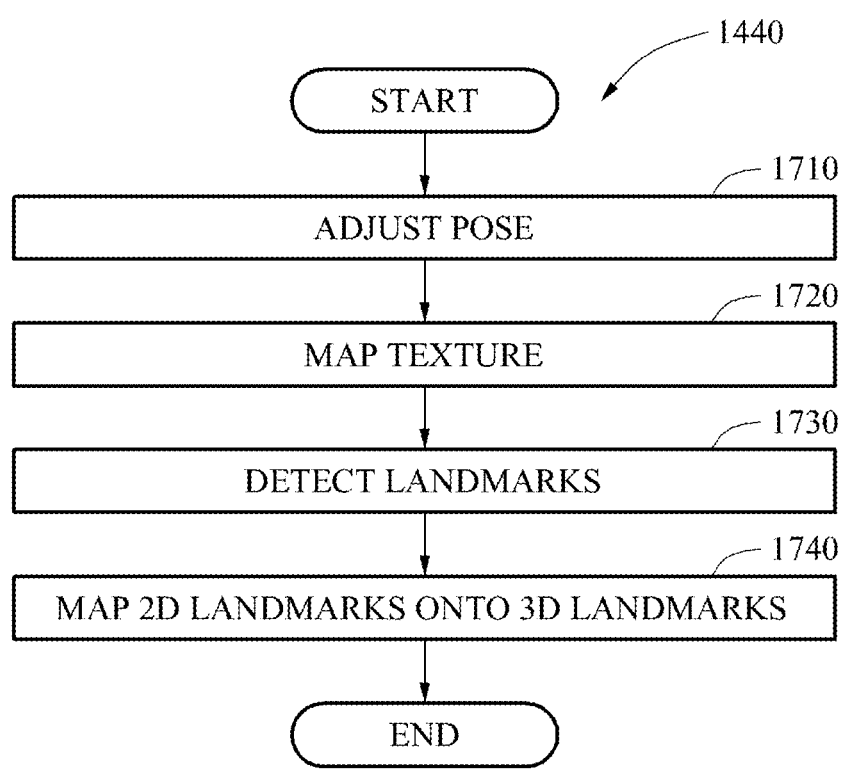
FIG. 17 is a flowchart illustrating an example of a method of updating 3D landmarks.

FIG. 17 illustrates a flowchart of an example of a method of updating 3D landmarks. Referring to FIG. 17, the adjustment apparatus adjusts a pose of the 3D face model by rotation according to a current geometric parameter in operation 1710.

The adjustment apparatus maps the 3D face model with the pose adjusted to a texture in operation 1720. For example, the adjustment apparatus may two-dimensionally project the 3D face model with the adjusted pose to obtain a 2D texture image, thereby mapping the 3D face model with the adjusted pose to a texture.

The adjustment apparatus detects landmarks in operation 1730. According to one example, the adjustment apparatus may detect new 2D landmarks from the 2D texture image.

The adjustment apparatus maps the 2D landmarks to the 3D landmarks in operation 1740.

For example, the adjustment apparatus may retrieve 3D landmarks corresponding to the new 2D landmarks and update the 3D landmarks using the retrieved 3D landmarks.

Figure 18:
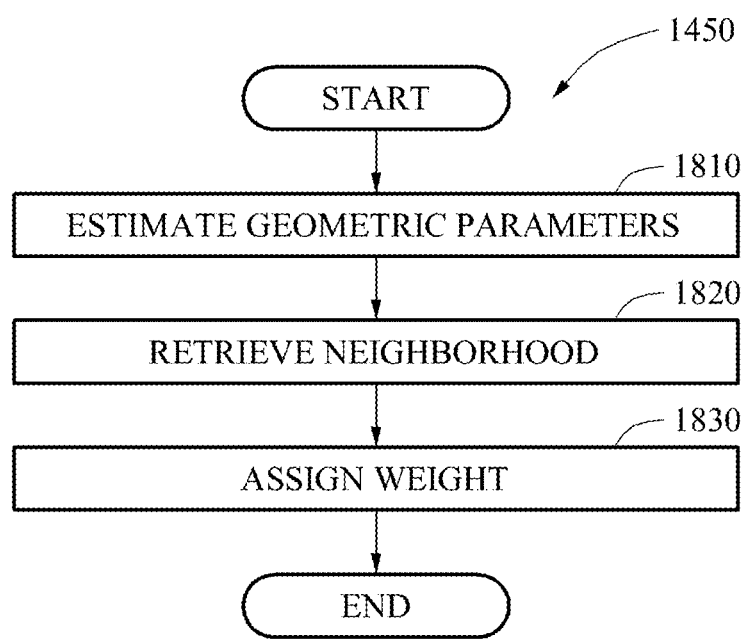
FIG. 18 is a flowchart illustrating an example of a method of updating a weight for landmarks.

FIG. 18 illustrates a flowchart of an example of a method of updating a weight for landmarks. Referring to FIG. 18, the adjustment apparatus estimates geometric parameters in operation 1810.

In operation 1820, the adjustment apparatus retrieves a neighborhood based on the geometric parameters estimated in operation 1810. In this example, the term "neighborhood" may be understood as pose information similar to current pose information on the 3D face model, that is, pose information with a deviation from the current pose information being within a preset threshold range.

The adjustment apparatus may retrieve pose information similar to the current pose information on the 3D face mode from the face image database stored in advance.

The adjustment apparatus assigns a weight to the neighborhood in operation 1830. The adjustment apparatus may retrieve a 2D face sample image corresponding to the similar pose information from the face image database. The adjustment apparatus may determine a weight for 2D landmarks corresponding to the retrieved 2D face sample image based on second deviations between the 2D landmarks and the new 2D landmarks. The adjustment apparatus may determine the weight for the 2D landmarks in inverse proportion to the second deviations.

Figure 19:
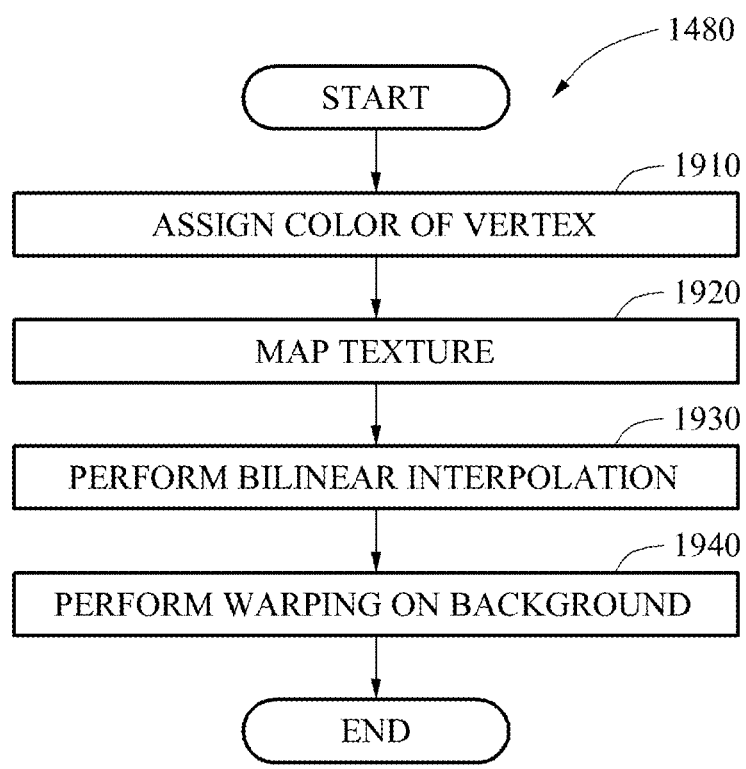
FIG. 19 is a flowchart illustrating an example of a method of mapping a background preserving texture.

FIG. 19 illustrates a flowchart of an example of a method of mapping a background preserving texture. Referring to FIG. 19, the adjustment apparatus assigns a color of a vertex in operation 1910. For example, the adjustment apparatus may assign the color of the vertex by fitting vertexes of the reconstructed 3D face model to the 2D face image.

The adjustment apparatus maps a texture in operation 1920. The adjustment apparatus may assign a texture of the fitted 2D face image to the vertexes of the reconstructed 3D face model and determine an occluded vertex in the 3D face model based on the final geometric parameter and the final shape parameter. The adjustment apparatus may assign a texture to the occluded vertex.

The adjustment apparatus performs bilinear interpolation in operation 1930. The adjustment apparatus determines a pixel color of a background region other than a face region in a face image obtained by two-dimensionally projecting the 3D texture model.

The adjustment apparatus performs warping on a background in operation 1940. Warping refers to geometric processing that increases or adjusts an image size. Unlike scaling, warping may not achieve a uniform size change with respect to an entire image. An operation of an example of an adjustment apparatus warping the background will be described with reference to FIG. 20.

Figure 20:
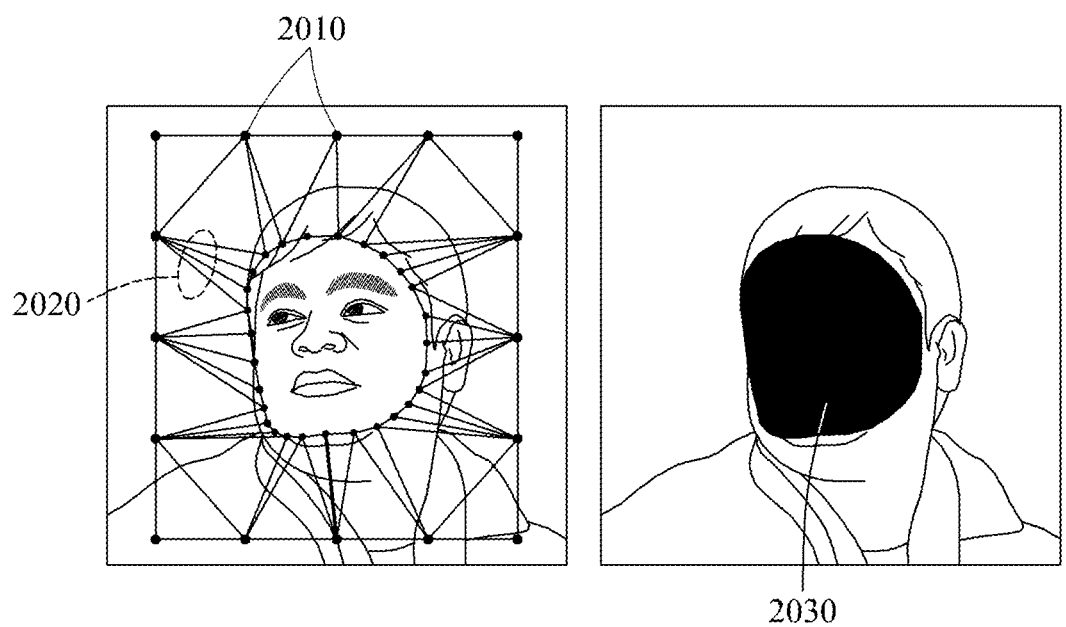
FIG. 20 illustrates an example of a method of warping a background.

FIG. 20 illustrates an example of a method of warping a background. Referring to FIG. 20, the adjustment apparatus may set additional landmarks 2010 for the background region in the 2D face image after determining the pixel color for the background region in operation 1930. The adjustment apparatus may set pixel vertexes corresponding to a surrounding region of the face region in the 2D face image with the finally adjusted pose.

The adjustment apparatus may perform piece-wise transformation between triangles 2020 corresponding to the pixel vertexes using triangulation to acquire color values of corresponding points (corresponding pixels) of the additional landmark. Accordingly, in the example, loss of the face region caused by inaccurate landmark positions may be avoided and accuracy of the face image may be improved. The adjustment apparatus may combine the 2D face image with the finally adjusted pose with portion 2030.

Figure 21:
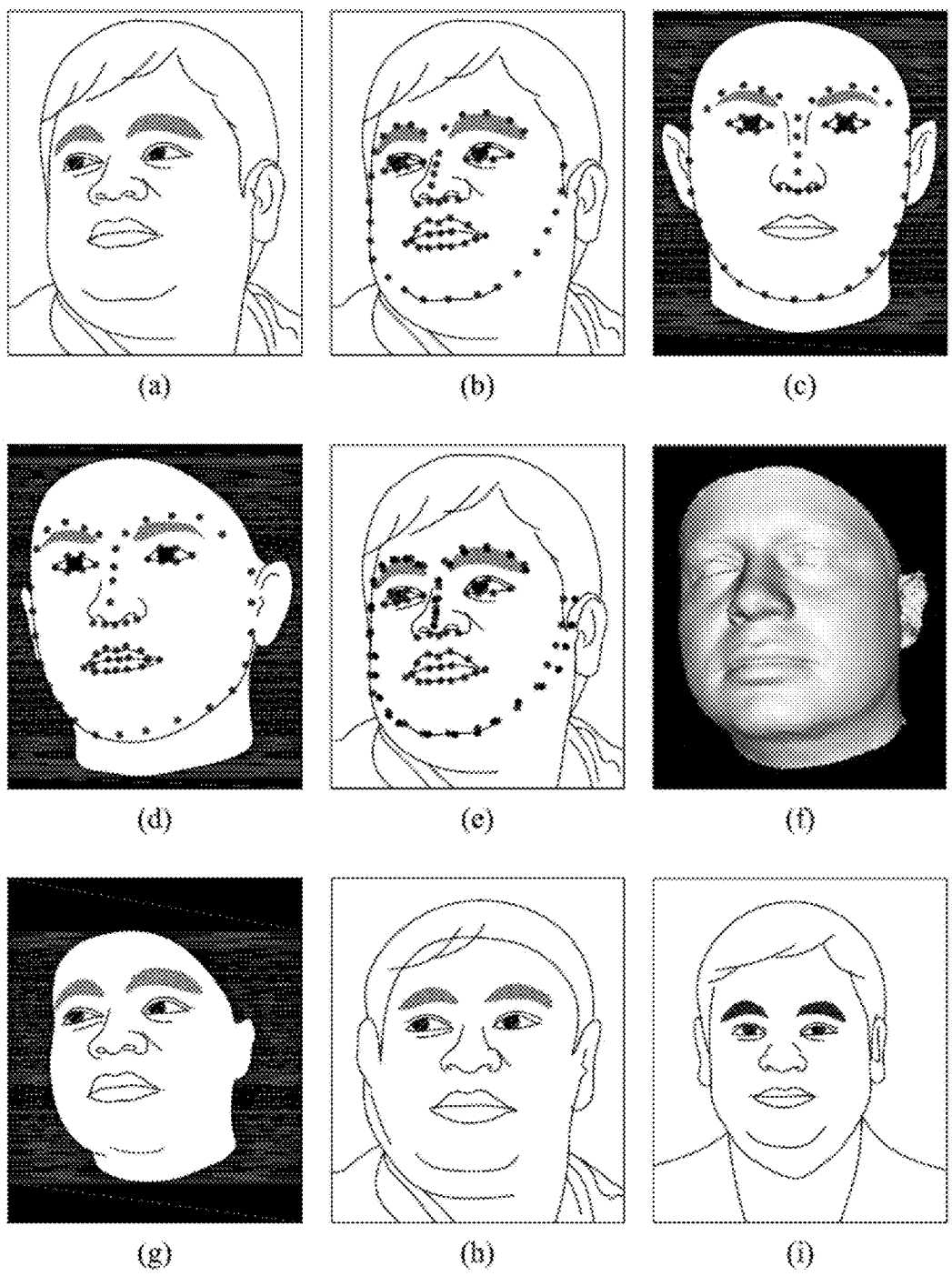
FIG. 21, images (a) through (i), illustrate examples of images output while performing an example of a method of adjusting a face pose in an image.

Referring to FIG. 21, images (a) through (i) illustrate examples of images output while performing an example of a method of adjusting a face pose in an image.

An image is changed as follows during a process of adjusting a face pose in a face image.

The image (a) is a 2D face image input to the adjustment apparatus. In this example, the 2D face image illustrates a non-frontal view pose.

The adjustment apparatus may automatically detect 2D landmarks as illustrated in the image (b) from the image (a), which is the initial 2D face image.

Referring to the image (c), the adjustment apparatus may automatically detect landmarks of a 3D face model and determine an initial weight for the landmarks.

Referring to the image (d), the adjustment apparatus may adjust a face pose of the 3D face model and automatically detect landmarks from the 3D face model with the adjusted pose to determine a weight for the landmarks.

Referring to the image (e), the adjustment apparatus may match the 2D landmarks with the 3D landmark of the 3D face model. Referring to the image (f), the adjustment apparatus may reconstruct the 3D face model based on a result of matching the landmarks.

Referring to the image (g), the adjustment apparatus may impart a color to a vertex of the 3D face model. Referring to the image (h), the adjustment apparatus may acquire a 2D face image with an adjusted pose by two-dimensionally projecting the 3D face model and may impart a color to a vertex (pixel point) of a background region other than a face region.

The image (i) is an actual frontal view face image.

Comparing the image (h) with the image (i), the 2D face image acquired by adjusting the pose in the face image according to this example is comparatively similar to the actual frontal view face image.

Figure 22:
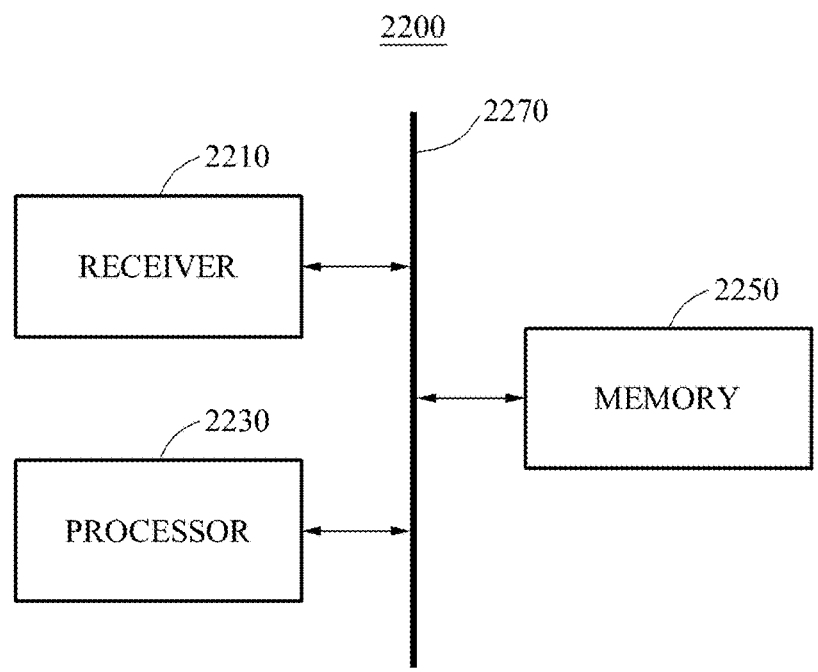
FIG. 22 is a block diagram illustrating an example of an apparatus for adjusting a face pose in an image.

FIG. 22 illustrates a block diagram of an example of an apparatus for adjusting a pose in a face image according to an example. Referring to FIG. 22, the adjustment apparatus 2200 according to the example includes a receiver 2210, a processor 2230, and a memory 2250. The receiver 2210, the processor 2230, and the memory 2250 are hardware components. The receiver 2210, the processor 2230, and the memory 2250 may communicate with each other through a bus 2270.

The receiver 2210 receives a 2D face image. For example, the receiver 2210 may receive a 2D face image taken by a camera in a mobile terminal.

The processor 2230 determines an initial pose of a 3D face model based on 2D landmarks detected from the 2D face image, thereby setting 3D landmarks included in the 3D face model. The processor iteratively adjusts a face pose and shape of the 3D face model to update the 3D landmarks and changes a face pose in the 2D face image based on the updated 3D landmarks.

The memory 2250 may store a face image database. The face image database may include, for example, a plurality of 2D face sample images, actually detected landmarks of the 2D face sample images, and actually measured geometric parameters from the 2D face sample images.

In addition, the processor 2230 may perform at least one of the methods illustrated with reference to FIGS. 1 to 21. The processor 2230 may execute a program and control the adjustment apparatus 2200. A program code executed by the processor 2230 may be stored in the memory 2250. The adjustment apparatus 2200 may be connected to an external device (for example, personal computer or network) through an input/output device (not shown) and exchange data.

At least one of the methods illustrated with reference to FIGS. 1 to 21 may be realized as an application operated by a processor in a tablet computer, a smartphone or a wearable device, or be realized in a form of a chip and embedded in a smartphone, a wearable device, an intelligent vehicle or a user authentication device.

Figure 23:
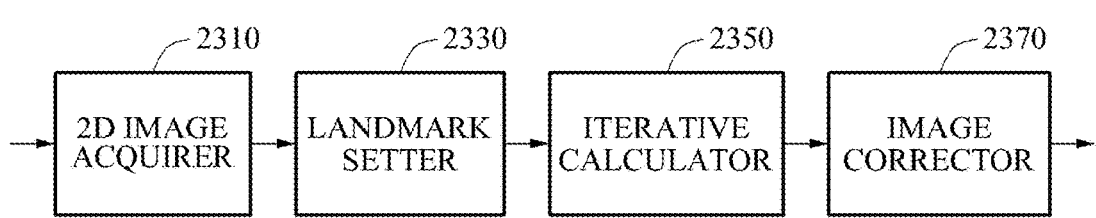
FIG. 23 is a block diagram illustrating another example of an apparatus for adjusting a face pose in an image.

FIG. 23 illustrates another example of an apparatus for adjusting a face pose in an image. Referring to FIG. 22, the adjustment apparatus 2300 includes a 2D image acquirer 2310, a landmark setter 2330, an iterative calculator 2350, and an image adjustor 2370. The 2D image acquirer 2310, the landmark setter 2330, the iterative calculator 2350, and the image adjustor 2370 may be implemented with one or more processor 2230 and memory 2250.

The 2D image acquirer 2310 acquires a 2D face image in which a face pose is to be adjusted.

The landmark setter 2330 detects a 2D landmark in the 2D face image and confirms a 3D landmark detected from a 3D face model corresponding to the 2D landmark.

The iterative calculator 2350 updates a 3D landmark based on the 3D landmark confirmed by the landmark setter 2330 using an iterative calculation method.

In practical applications, the iterative calculator 2350 updates a 3D landmark using a geometric parameter of the 3D face model obtained in previous iteration in an iterative calculation process and calculates a geometric parameter base on the updated 3D landmark in current iteration.

The iterative calculator 2350 ends iterative calculation when an iteration end condition is satisfied, that is, when a Euclidean distance between geometric parameters of the 3D face model which are acquired in two subsequent iterations is smaller than a threshold or when the iteration process is performed a preset number of times.

When the iteration end condition is not satisfied, the iterative calculator 2350 updates a 3D landmark using a geometric parameter of the 3D face model obtained in previous iteration and calculates a geometric parameter base on the updated 3D landmark in current iteration. Otherwise, the iterative calculator 2350 goes back to a geometric parameter of the 3D face model obtained in final iteration.

The image adjustor 2370 confirms a 2D face image with a pose adjusted based on the 3D landmark updated by the iterative calculator 2350.

Specifically, the image adjustor 2370 confirms a geometric parameter in final iteration based on the 3D landmark updated by the iterative calculator 2350 and confirms a 2D face image with a pose adjusted based on the geometric parameter obtained in final iteration.

The apparatuses, units, modules, devices, and other components illustrated in FIGS. 22 and 23 that perform the operations described herein with respect to FIGS. 2, 3, and 5 through 19 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to 2, 3, and 5 through 19. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of adjusting a pose in a face image, comprising:
    measuring first deviations between two-dimensional (2D) landmarks from a 2D face image of a face and corresponding 2D landmarks from a first sample 2D face image
    positioning three-dimensional (3D) landmarks in a 3D face model and adjusting a pose of the 3D face model by determining initial pose information of the 3D face model based on the first deviations;
    acquiring a 2D texture image by two-dimensionally projecting the 3D face model with the adjusted pose;
    measuring second deviations between new 2D landmarks from the 2D texture image and corresponding 2D landmarks from a second sample 2D face image;
    updating positions of the 3D landmarks and adjusting the pose of the 3D face model by determining updated pose information based on the second deviations; and
    adjusting a pose in the 2D face image based on the 3D landmarks.

2. The method of claim 1, wherein the positioning of the 3D landmarks comprises determining an initial geometric parameter representing an initial pose of the 3D face model based on the 2D landmarks.

3. The method of claim 2, wherein the initial geometric parameter comprises the initial pose information on the 3D face model, and the initial pose information is represented by a pose information vector comprising roll information, pitch information, and yaw information on the 3D face model.

4. The method of claim 2, wherein the determining of the initial geometric parameter comprises:
    determining an initial weight for the 2D landmarks based on the 2D landmarks; and
    determining the initial geometric parameter that minimizes a first energy function based on the initial weight, the 2D landmarks, and the 3D landmarks.

5. A method of adjusting a pose in a face image, comprising:
    detecting two-dimensional (2D) landmarks from a 2D face image;
    positioning three-dimensional (3D) landmarks in a 3D face model and adjusting a pose of the 3D face model by determining an initial pose of the 3D face model based on the 2D landmarks;
    updating the 3D landmarks by iteratively adjusting a pose and a shape of the 3D face model; and
    adjusting a pose in the 2D face image based on the updated 3D landmarks,
    wherein the positioning of the 3D landmarks comprises determining an initial geometric parameter representing the initial pose of the 3D face model based on the 2D landmarks,
    wherein the determining of the initial geometric parameter comprises:
        determining an initial weight for the 2D landmarks based on the 2D landmarks, and
        determining the initial geometric parameter that minimizes a first energy function based on the initial weight, the 2D landmarks, and the 3D landmarks, and
    wherein the determining of the initial weight comprises:

measuring deviations between the 2D landmarks and an actually detected landmark of a 2D face sample image stored in a face image database; and determining the initial weight for the 2D landmarks based on the measured deviations, and wherein the updating of the 3D landmarks comprises:

acquiring a 2D texture image by two-dimensionally projecting the 3D face model with the adjusted pose;

measuring second deviations between new 2D landmarks from the 2D texture image and corresponding 2D landmarks from a second sample 2D face image.

6. The method of claim 5, wherein the determining of the initial weight for the 2D landmarks based on the measured deviations comprises:

arranging the 2D landmarks based on the measured deviation;

selecting some 2D landmarks having measured deviations smaller than a preset threshold among the arranged 2D landmarks; and assigning the initial weight to the selected 2D landmarks in inverse proportion to measured deviations.

7. The method of claim 5, wherein the face image database comprises at least one of a plurality of 2D face sample images, actually detected landmarks from the 2D face sample images, and actually measured geometric parameters from the 2D face sample images.

8. The method of claim 2, wherein the updating of the 3D landmarks comprises:

updating the 3D landmarks based on the initial geometric parameter;

determining a weight for the updated 3D landmarks; and determining, based on the weight, a geometric parameter and a shape parameter of the 3D face model that minimize a second energy function.

9. The method of claim 8, wherein the updating of the 3D landmarks based on the initial geometric parameter comprises:

adjusting the pose of the 3D face model based on the initial geometric parameter;

the acquiring of the 2D texture image by two-dimensionally projecting the 3D face model with the adjusted pose;

detecting the new 2D landmarks from the 2D texture image;

retrieving 3D landmarks corresponding to the new 2D landmarks; and updating the 3D landmarks using the retrieved 3D landmarks.

10. The method of claim 9, wherein the determining of the weight for the updated 3D landmarks comprises:

acquiring current pose information on the 3D face model from the initial geometric parameter;

retrieving pose information substantially corresponding to the current pose information on the 3D face model from a previously stored face image database;

retrieving the second sample 2D face image corresponding to the retrieved pose information from the face image database; and determining a weight for 2D landmarks corresponding to the retrieved sample 2D face image based on the second deviations between the 2D landmarks and the new 2D landmarks.

11. The method of claim 10, wherein the determining of the weight for the 2D landmarks comprises:

calculating an average of the second deviations; and determining the weight for the 2D landmarks in inverse proportion to the average of the second deviations.

12. The method of claim 10, wherein the pose information substantially corresponding to the current pose information comprises pose information with a deviation from the current pose information being within a preset threshold range.

13. The method of claim 8, wherein the updating of the 3D landmarks comprises iteratively adjusting the pose and shape of the 3D face model based on whether a deviation between a geometric parameter of the 3D face model acquired in (i-2)th iteration and a geometric parameter acquired in (i-1)th iteration is smaller than a preset threshold or whether iteration is performed a preset number of times.

14. The method of claim 13, wherein the adjusting of the pose in the 2D face image comprises:

reconstructing the 3D face model based on a final geometric parameter and a final shape parameter calculated in final iteration; and adjusting the pose in the 2D face image by two-dimensionally projecting the reconstructed 3D face model.

15. The method of claim 14, further comprising mapping a background preserving texture to the 2D face image with the adjusted pose.

16. The method of claim 15, wherein the mapping of the background preserving texture comprises determining a 3D texture model by imparting a color to the reconstructed 3D face model based on a pixel color of the 2D face image; and determining a pixel color for a background region other than a face region in a face image obtained by twodimensionally projecting the 3D texture model.

17. The method of claim 16, wherein the determining of the 3D texture model comprises:

fitting vertexes of the reconstructed 3D face model to the 2D face image based on the final geometric parameter and the final shape parameter;

assigning a texture of the fitted 2D face image to the vertexes of the reconstructed 3D face model; determining an occluded vertex in the 3D face model based on the final geometric parameter and the final shape parameter; and assigning a texture to the occluded vertex.

18. The method of claim 17, wherein the assigning of the texture to the occluded vertex comprises:

determining whether a symmetric point of the occluded vertex is occluded in the 3D face model; and assigning an average texture value of the 3D texture model to the occluded vertex in response to the symmetric point being determined to be occluded, and assigning a texture of the symmetric point to the occluded vertex in response to the symmetric point being determined not to be occluded.

19. The method of claim 16, wherein the determining of the pixel color for the background region comprises:

positioning additional landmarks for the background region in the two-dimensionally projected face image;

retrieving a corresponding point to the additional landmarks from the 3D texture model; and acquiring a color value for the corresponding point to the additional landmarks by performing piece-wise affine transformation.

20. A non-transitory computer readable medium storing instructions, which when executed by a processor, cause the processor to implement the method of claim 1.

21. An apparatus for adjusting a face pose in an image, the apparatus comprising:

a processor configured to:

measure first deviations between two dimensional (2D) landmarks from a 2D face image of a face and corresponding 2D landmarks from a first sample 2D face image position three-dimensional (3D) landmarks in a 3D face model and adjusting a pose of the 3D face model, stored in a memory, based on the first deviations, acquire a 2D texture image by two-dimensionally projecting the 3D face model with the adjusted pose, measure second deviations between new 2D landmarks from the 2D texture image and corresponding 2D landmarks from a second sample 2D face image, adjust positions of the 3D landmarks on the 3D face model based on the second deviations, and adjust a face pose in the 2D face image based on the positions of the 3D landmarks.

22. The apparatus of claim 21, further comprising:

a camera configured to capture the 2D face image; and a receiver configured to receive the 2D face image and provide the received 2D face image to the processor.

23. An apparatus for recognizing a person based on a 2D image, the apparatus comprising:

the apparatus for adjusting a face pose in an image of claim 21, wherein the processor is further configured to compare the adjusted face pose in the 2D face image with a plurality of face images stored in a database to recognize a person whose face is captured in the 2D face image.

24. A method of adjusting a pose in a face image, comprising: measuring first deviations between two-dimensional (2D) landmarks from a 2D face image of a face and corresponding 2D landmarks from a first sample 2D face image; determining initial pose information of a 3D face model based on the selected deviations; positioning three-dimensional (3D) landmarks in the 3D face model and adjusting a pose of the 3D face model based on the initial pose information; acquiring a 2D texture face image by two-dimensionally projecting the 3D face model with the adjusted face pose; detecting new 2D landmarks from the 2D texture face image; determining a new pose of the 3D face model based on second deviations between the new 2D landmarks and 2D landmarks from a second sample 2D face image; and repositioning at least some of the 3D landmarks in the 3D face model based on the new pose.

25. The method of claim 4, wherein:

the determining of the initial weight comprises the measuring of the first deviations;

the 2D landmarks from the first sample 2D face image are actually detected landmarks of the first sample 2D face image, and the first sample 2D face image is stored in a face image database; and the determining of the initial weight comprises determining the initial weight for the 2D landmarks based on the measured first deviations.

* * * * *